(12) United States Patent
Willis et al.

(10) Patent No.: US 7,477,960 B2
(45) Date of Patent: Jan. 13, 2009

(54) FAULT DETECTION AND CLASSIFICATION (FDC) USING A RUN-TO-RUN CONTROLLER

(75) Inventors: James E. Willis, Austin, TX (US); Merritt Funk, Austin, TX (US); Kevin Lally, Austin, TX (US); Kevin Pinto, Austin, TX (US); Masayuki Tomoyasu, Nirasaki (JP); Raymond Peterson, Manor, TX (US); Radha Sundararajan, Dripping Springs, TX (US)

(73) Assignee: Tokyo Electron Limited, Tokyo (JP)

( * ) Notice: Subject to any disclaimer, the term of this patent is extended or adjusted under 35 U.S.C. 154(b) by 255 days.

(21) Appl. No.: 11/058,321

(22) Filed: Feb. 16, 2005

(65) Prior Publication Data

US 2006/0184264 A1 Aug. 17, 2006

(51) Int. Cl.
*G06F 19/00* (2006.01)
(52) U.S. Cl. .................. 700/121; 700/45; 700/110; 700/174
(58) Field of Classification Search ............... 700/121, 700/51, 117, 30, 44, 80, 108, 109, 110, 174, 700/45; 438/7
See application file for complete search history.

(56) References Cited

U.S. PATENT DOCUMENTS

| 6,556,881 B1* | 4/2003 | Miller ................. 700/108 |
| 6,556,884 B1* | 4/2003 | Miller et al. .......... 700/121 |
| 6,748,280 B1* | 6/2004 | Zou et al. .............. 700/31 |
| 6,988,017 B2* | 1/2006 | Pasadyn et al. ........ 700/121 |
| 7,065,422 B1* | 6/2006 | Green ................... 700/108 |
| 2003/0014145 A1* | 1/2003 | Reiss et al. ........... 700/121 |
| 2003/0187602 A1 | 10/2003 | Bao et al. |
| 2005/0221514 A1 | 10/2005 | Pasadyn et al. |

* cited by examiner

*Primary Examiner*—Paul L Rodriguez
*Assistant Examiner*—Nathan Laughlin
(74) *Attorney, Agent, or Firm*—Oblon, Spivak, McClelland, Maier & Neustadt, P.C.

(57) ABSTRACT

A method for implementing FDC in an APC system including receiving an FDC model from memory; providing the FDC model to a process model calculation engine; computing a vector of predicted dependent process parameters using the process model calculation engine; receiving a process recipe comprising a set of recipe parameters, providing the process recipe to a process module; executing the process recipe to produce a vector of measured dependent process parameters; calculating a difference between the vector of predicted dependent process parameters and the vector of measured dependent process parameters; comparing the difference to a threshold value; and declaring a fault condition when the difference is greater than the threshold value.

51 Claims, 8 Drawing Sheets

FIG. 7

Control Strategy Editor

| Field | Value |
|---|---|
| Strategy Name: | IsoNested_Test |
| Description: | |
| Load Port: | LPC |
| Transfer Route: | IMM1-PM01-IMM1-PM02-LLM2-IMM1 |
| Metrology Data Failure: | PM Pause |
| Mode: | Standard |
| System Recipe: | NAKAN/NAKA-TYPE1 |
| Control Failure: | System Pause |

☑ Enabled

Usage Context Specification

- Lot ID(s):
- CJ ID(s):
- Cassette ID(s):
- Slot id(s):
- Wafer Type:
- Stat Time later than: YYYY-MM-DD [HH:MM[:SS]]
- Wafer ID(s):
- CJ ID(s):
- Cassette ID(s):
- Substrate ID(s):
- Scribed Wafer ID(s):
- Stat Time later than: YYYY-MM-DD [HH:MM[:SS]]

Control Plans (FF) | Feedback Plans (FB)

| Route Sequence | Target Module | Plan Name | Route Sequence | Route Sequence | Description |
|---|---|---|---|---|---|
| 1 | PM01 | | 1 | kcfunkcp | A-IEM-POLY/P1/NAKA/NAKA-P... |
| 2 | PM01 | | 2 | TotalTrimCP | A-IEM-POLY/P1/NAKA/NAKA-P... |

[ Save ]  [ Cancel ]  [ help ]

R2R Control Plan Editor

Plan Name: TotalTrimGP  Module: PM01  Recipe: A-IBM-POLY/p1/NAKA/NAKA-POLY

Description: Iso/Nested--Nested Structures  ☐ Send alarm on FB plan update  Updateed: 2004-02-13 14:39:34

Data Sources

| Symbol | Type | Description | Parameter/value |
|---|---|---|---|
| d1 | ControlPlanValue | Bias Trim Amount | kcfunkcp/p1 |
| d2 | ControlPlanValue | Calibrated Nested Measurement | kcfunkcp/t1 |
| o1 | Desired Output | Desired Final Nested Measurement | 90.0 |

Target Calculation, t=F(d,o,f)

tx =   f(dx, ox, fx)

t1 = d2-d1-o1

Model Selections

| # | Model Type | Model Name | Target | Lower Limit | Upper Limit | Static Recipe Output (y) |
|---|---|---|---|---|---|---|
| 1 | Formula Modle BARCFM | | t1 | 0.0 | 40.0 | |

Predicted Result Calculation (Used in feedback plan)

p1= y

Model Selections: Select the models and set the limits for each calculated target defined in the Target Calculation.

[ Save ]  [ Cancel ]  [ help ]

*FIG. 8*

FAULT DETECTION AND CLASSIFICATION (FDC) USING A RUN-TO-RUN CONTROLLER

CROSS-REFERENCE TO RELATED APPLICATIONS

This application is related to U.S. application Ser. No. 10/962,596, filed Oct. 13, 2004, the entire contents of which is incorporated herein by reference.

FIELD OF THE INVENTION

The invention relates to semiconductor wafer processing. More particularly, the invention relates to performing fault detection and classification (FDC) using run-to-run controllers.

BACKGROUND OF THE INVENTION

Recent advances in advanced process control (APC) in the area of semiconductor processing equipment (SPE), or tools, used by semiconductor manufacturing facilities (fabs) in the production of high performance integrated circuits, include the addition of monitoring hardware and software at the tool level (TL) that is used for the purpose of fault detection and classification (FDC). FDC provides the capability to establish a baseline of tool operation and by comparing the current operation with the baseline, detect faults as well as classify or determine the root cause of the problem. The techniques used for FDC include the use of statistical process control (SPC) charts, principle component analysis (PCA) and partial least squares (PLS). Each of these techniques provides a numerical comparison of the current operation to the baseline. Limits can then be placed around the normal value or values of this comparison and alarms can be generated whenever the comparison exceeds one or more of the numerical limits. When an alarm is generated, the process can be stopped or other action taken.

Operation of an FDC system at the tool level has the advantages of decreasing production scrap due to tool level faults, decreasing tool downtime by improving diagnostic capability and decreasing the amount of unscheduled maintenance by monitoring parts wear and scheduling preventative maintenance.

The use of feedforward controllers in semiconductor processing has long been established practice by fabs in the manufacture of semiconductor integrated circuits. Recent advances in APC used by fabs in the production of high performance integrated circuits include the addition of hardware and software at the tool level that is used for the purpose of run-to-run (R2R) control.

However, the simultaneous operation of FDC and an R2R controller can be difficult or mutually exclusive. This is because an FDC system may interrupt the R2R controller with detected faults or parameter changes to prevent faults. A conventional R2R controller is unable to integrate the information received from an FDC system and continue to run real time. This is especially true for W2W processing, which provides significantly more data to process than L2L processing.

In fact, it was previously thought that integrating FDC and R2R control was not possible, as both processes are so computationally intensive. Thus, to applicants' knowledge, integration of an FDC system and an R2R controller has never been done before. The present inventors recognized that this integration was possible, and took the necessary steps and solved the required problems to achieve the present invention.

SUMMARY OF THE INVENTION

One aspect of the invention provides a method for implementing FDC in an APC system comprising: receiving an FDC model from memory; providing the FDC model to a process model calculation engine; computing a vector of predicted dependent process parameters using the process model calculation engine; receiving a process recipe comprising a set of recipe parameters, providing the process recipe to a process module; executing the process recipe to produce a vector of measured dependent process parameters; calculating a difference between the vector of predicted dependent process parameters and the vector of measured dependent process parameters; comparing the difference to a threshold value; and declaring a fault condition when the difference is greater than the threshold value.

In another embodiment, a method of operating a semiconductor processing system is provided that includes: positioning a wafer in a process module; receiving process context information for the wafer to a processor; executing a control strategy on the processor using process context information for the wafer; executing an analysis strategy on the processor using process context information for the wafer; executing an intervention plan on the processor when an alarm has been established by at least one executed strategy; and removing the wafer from the process module when an alarm condition has not been established by at least one executed plan.

In another embodiment, a computer-directed system is provided including: a processing tool configured to process a wafer; and a processor configured to, receive process data from executed process runs, receive an FDC model from memory, compute a vector of predicted dependent process parameters using the FDC model, receive a process recipe comprising a set of recipe parameters, execute the process recipe to produce a vector of measured dependent process parameters, calculate a difference between the vector of predicted dependent process parameters and the vector of measured dependent process parameters, compare the difference to a threshold value, and declare an alarm condition when the difference is greater than the threshold value.

BRIEF DESCRIPTION OF THE DRAWINGS

A more complete appreciation of various embodiments of the invention and many of the attendant advantages thereof will become readily apparent with reference to the following detailed description, particularly when considered in conjunction with the accompanying drawings, in which:

FIG. 7 illustrates an exemplary view of an FDC Control Strategy Screen in accordance with an embodiment of the invention; and FIG. 8 illustrates an exemplary view of an FDC Control Plan Editor Screen in accordance with an embodiment of the invention.

DETAILED DESCRIPTION OF SEVERAL EMBODIMENTS

Advances in semiconductor process technology require that run-to-run (R2R) control be provided at the semiconductor processing equipment tool level. In order for the control of process to be stable and robust, it is also necessary to provide fault detection and classification at the semiconductor processing equipment tool level. However, simple fault detection techniques are incompatible with R2R control and have the potential for generating frequent false alarms. An integrated system of advanced process control comprising data collection, data analysis, FDC, R2R control, automated DOE, SPC charting, PCA and PLS analysis can be used to provide accurate and reliable process control required by the manufacturers of high performance semiconductor integrated circuits.

Figure 1:
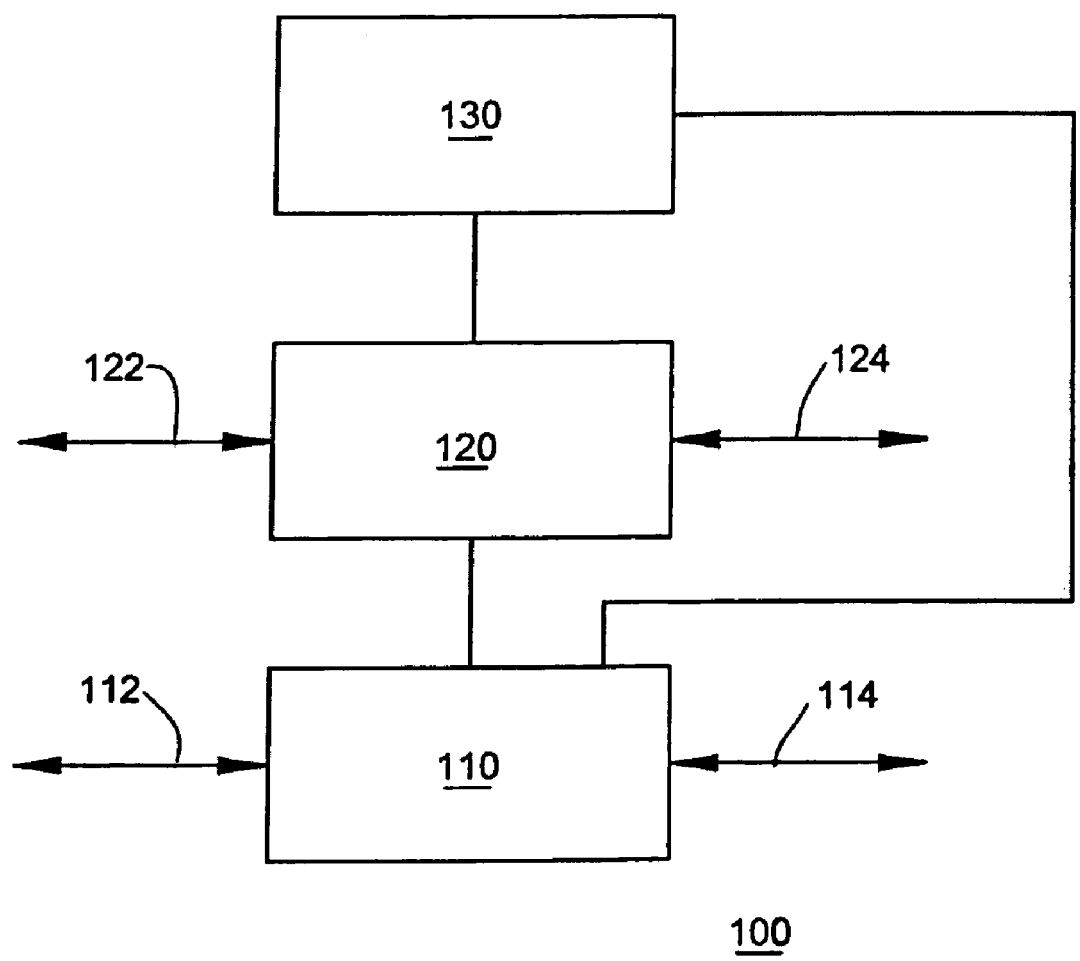
FIG. 1 shows an exemplary block diagram of a processing system in accordance with an embodiment of the present invention.

FIG. 1 shows an exemplary block diagram of a processing system in accordance with an embodiment of the present invention. In the illustrated embodiment, processing system 100 comprises a processing tool 110, a controller 120 coupled to the processing tool 110, and a manufacturing equipment system (MES) 130 coupled to the controller 120. In addition, at least one of the processing tool 110, the controller 120, and the MES 130 can comprise a GUI component and/or a database component (not shown). In alternate embodiments, the GUI component and/or the database component are not required.

Some setup and/or configuration information can be obtained by the processing tool 110 and/or the controller 120 from the factory system 130. Factory level business rules can be used to establish a control hierarchy. For example, the processing tool 110 and/or the controller 120 can operate independently, or can be controlled to some degree by the factory system 130. In addition, factory level business rules can be used to determine when a process is paused and/or stopped, and what is done when a process is paused and/or stopped. In addition, factory level business rules can be used to determine when to change a process and how to change the process.

Business rules can be used to specify the action taken for normal processing and the actions taken on exceptional conditions. The actions can include: initial model loading, pre-etch metrology data filtering, controller recipe selection, post-etch metrology data filtering, feedback calculation, and a model update.

Business rules can be defined at a control strategy level, a control plan level or a control model level. Business rules can be assigned to execute whenever a particular context is encountered. When a matching context is encountered at a higher level as well as a lower level, the business rules associated with the higher level can be executed. GUI screens can be used for defining and maintaining the business rules. Business rule definition and assignment can be allowed for users with greater than normal security level. The business rules can be maintained in the database. Documentation and help screens can be provided on how to define, assign, and maintain the business rules.

MES 130 can monitor some system processes using data reported from the databases associated with the processing tool 110 and/or the controller 120. Factory level business rules can be used to determine which processes are monitored and which data is used. For example, the processing tool 110 and/or the controller 120 can independently collect data, or the data collection process can be controlled to some degree by the factory system 130. In addition, factory level business rules can be used to determine how to manage the data when a process is changed, paused, and/or stopped.

In addition, the MES 130 can provide run-time configuration information to the processing tool 110 and/or the controller 120. For example, automated process control (APC) settings, targets, limits, rules, and algorithms can be downloaded from the factory to the processing tool 110 and/or the controller 120 as an "APC recipe", an "APC system rule", and "APC recipe parameters" at run-time.

Some setup and/or configuration information can be determined by the processing tool 110 and/or the controller 120 when they are initially configured by the system. System level business rules can be used to establish a control hierarchy. For example, the processing tool 110 and/or the controller 120 can operate independently, or the processing tool 110 can be controlled to some degree by the controller 120. In addition, system rules can be used to determine when a process is paused and/or stopped, and what is done when a process is paused and/or stopped. In addition, system rules can be used to determine when to change a process and how to change the process. Furthermore, a controller 120 can use tool level rules to control some tool level operations.

In general, rules allow system and/or tool operation to change based on the dynamic state of the system.

In FIG. 1, one processing tool 110, and one controller 120 are shown, but this is not required for the invention. The semiconductor processing system can comprise any number of processing tools having any number of controllers associated with them in addition to independent process tools and modules.

The processing tool 110 and/or the controller 120 can be used to configure any number of processing tools having any number of processing tools associated with them in addition to any number of independent process tools and modules. The processing tool 110 and/or the controller 120 can collect, provide, process, store, and display data from processes involving processing tools, processing subsystems, process modules, and sensors.

The processing tool 110 and/or the controller 120 can comprise a number of applications including at least one tool-related application, at least one module-related application, at least one sensor-related application, at least one interface-related application, at least one database-related application, at least one GUI-related application, and at least one configuration application.

For example, the system 100 can comprise an APC system from Tokyo Electron Limited, Tokyo, Japan, (TEL) that can include a Unity Tool, Telius Tool, a Trias Tool, and/or a Lithius Tool and their associated processing subsystems and process modules. In addition, the system can comprise a run-to-run (R2R) controller, such as the Ingenio system server from Tokyo Electron Limited, and an integrated metrology module (IMM) from Tokyo Electron Limited. Alternately, the controller 120 can support other process tools and other process modules.

A GUI component (not shown) can provide easy to use interfaces that enable users to: view tool status and process module status; create and edit x-y charts of summary and raw (trace) parametric data for selected wafers; view tool alarm logs; configure data collection plans that specify conditions for writing data to the database or to output files; input files to statistical process control (SPC) charting, modeling and spreadsheet programs; examine wafer processing information for specific wafers, and review data that is currently being saved to the database; create and edit SPC charts of process parameters, and set SPC alarms which generate e-mail warnings; run multivariate PCA and/or PLS models; and view diagnostics screens in order to troubleshoot and report problems with the TL controller 120.

Raw data and trace data from the tool can be stored as files in a database. In addition, IM data and host metrology data can be stored in the database. The amount of data depends on the data collection plans that are configured, as well as the frequency with which processes are performed and processing tools are run. The data obtained from the processing tools, the processing chambers, the sensors, and the operating system can be stored in the database.

In an alternate embodiment, system 100 can comprise a client workstation (not shown). The system can support a plurality of client workstations. A client workstation can allow a user to perform configuration procedures; to view status including tool, controller, process, and factory status; to view current and historical data; to perform modeling and charting functions; and to input data to the controller. For example, a user may be provided with administrative rights that allow him to control one or more processes performed by a controller.

Processing tool 110 and the controller 120 can be coupled to MES 130 and can be part of an E-Diagnostic System. The processing tool 110 and/or the controller 120 can exchange information with a factory system. In addition, the MES 130 can send command and/or override information to the processing tool 110 and/or the controller 120. For example, the MES 130 can feed-forward to the processing tool 110 and/or the controller 120 downloadable recipes for any number of process modules, tools, and measuring devices, with variable parameters for each recipe. Variable parameters can include final CD targets, limits, offsets, and variables in the tool level system that needs to be adjustable by lot. In addition, metrology data can be feed-forwarded to controller 120 from a factory system or a lithography tool, such as a Lithius tool from Tokyo Electron Limited.

Furthermore, MES 130 can be used to provide measurement data, such as CD SEM information, to the controller. Alternately, the CD SEM information can be provided manually. Adjustment factors are used to adjust for any offset between the IM and CD SEM measurements. Manual and automated input of CD SEM data includes a timestamp, such as a date, for proper insertion in to the history of the FB control loop in the R2R controller.

Configurable items can be configured as a set of variable parameters sent from the factory system using GEM SECS communications protocol. For example, variable parameters can be passed as part of an "APC Recipe". An APC recipe may contain more than one sub recipes and each sub recipe can contain variable parameters.

A single processing tool 110 is also shown in FIG. 1, but this is not required for the invention. Alternately, additional processing tools can be used. In one embodiment, a processing tool 110 can comprise one or more processing modules. Processing tool 110 can comprise at least one of an etch module, a deposition module, a polishing module, a coating module, a developing module, and a thermal treatment module.

Processing tool 110 can comprise links (112 and 114) for coupling to at least one other processing tool and/or controller. For example, other processing tools and/or controllers can be associated with a process that has been performed before this process, and/or other controllers can be associated with a process that is performed after this process. Link 112 and link 114 can be used to feed forward and/or feed back information. For example, feed forward information can comprise data associated with an in-coming wafer. This data can include lot data, batch data, run data, composition data, and wafer history data. The data can comprise pre-process data that can be used to establish an input state for a wafer. A first part of the pre-process data can be provided to the controller 120, and a second part of the pre-process data can be provides to the processing tool 110. Alternately, the two parts can comprise the same data.

The processing tool 110 can comprise a single integrated metrology module (IMM) device (not shown) or multiple measurement devices. The system 100 can include module related measurement devices, tool-related measurement devices, and external measurement devices. For example, data can be obtained from sensors coupled to one or more process modules and sensors coupled to the processing tool.

Sensors can include an Optical Emission Spectroscopy (OES) sensor and fault detection applications can use data from the OES sensor. For example, the wavelength ranges can span from 201 to 205 nm to 896 to 900 nm.

In addition, data can be obtained from an external device such as a SEM tool and an Optical Digital Profiling (ODP) tool. An ODP tool is available for Timbre Technologies Inc. (a TEL company) that provides a patented technique for measuring the profile of a structure in a semiconductor device. For example, ODP techniques can be used to obtain critical dimension (CD) information, structure profile information, or via profile information.

Controller 120 is coupled to processing tool 110 and MES 130, and information such as pre-processing data and post-processing data can be exchanged between them. For example, when an internal reset event is being generated from the tool, the controller 120 can send a message, containing information about the event, to the MES 130. This can allow the factory system and/or factory personnel to make the necessary changes to minimize the number of wafers at risk after a major change occurs such as those that occur during corrective or preventative maintenance.

A single controller 120 is also shown in FIG. 1, but this is not required for the invention. Alternately, additional controllers can be used. For example, controller 120 can comprise a run-to-run (R2R) controller, a feed-forward (FF) controller, process model controller, feedback (FB) controller, or a process controller, or a combination of two or more thereof (all not shown in FIG. 1).

Controller 120 can comprise links (122 and 124) for coupling to at least one other controller. For example, other controllers can be associated with a process that has been performed before this process, and/or other controllers can be associated with a process that is performed after this process. Link 122 and link 124 can be used to feed forward and/or feed back information.

The controller 120 can use the difference between a measured critical dimension of the incoming material (input state) and a target critical dimension (desired state) to predict, select, or calculate a set of process parameters to achieve a desired process result that is changing the state of the wafer from the input state to the desired state. For example, this predicted set of process parameters can be a first estimate of a recipe to use based on an input state and a desired state. In one embodiment, data such the input state and/or the desired state data can be obtained from a host.

In one case, the controller 120 knows the input state and a model equation for the desired state for the wafer, and the controller determines a set of recipes that can be performed on the wafer to change the wafer from the input state to a processed state. For example, the set of recipes can describe a multi-step process involving a set of process modules.

The time constant for the controller can be based on the time between measurements. When measured data is available after a lot is completed, the controller's time constant can be based on the time between lots. When measured data is available after a wafer is completed, the controller's time constant can be based on the time between wafers. When measurement data is provided real-time during processing, the controller's time constant can be based on processing steps, within a wafer. When measured data is available while a wafer is being processed or after a wafer is completed or after the lot is completed, the controller can have multiple time constants that can be based on the time between process steps, between wafers, and/or between lots.

One or more controllers can be operating at any point in time. For example, one controller can be in an operating mode while a second controller can be in a monitoring mode. In addition, another controller can be operating in a simulation mode. A controller can comprise a single loop or multiple loops, and the loops can have different time constants. For example, loops can be dependent on wafer timing, lot timing, batch timing, chamber timing, tool timing, and/or factory timing.

The controller can compute a predicted state for the wafer based on the input state, the process characteristics, and a process model. For example, a trim rate model can be used along with a processing time to compute a predicted trim amount. Alternately, an etch rate model can be used along with a processing time to compute an etch depth, and a deposition rate model can be used along with a processing time to compute a deposition thickness. In addition, models can include SPC charts, PLS models, PCA models, FDC models, and Multivariate Analysis (MVA) models.

The controller can receive and utilize externally provided data for process parameter limits in a process module. For example, the controller GUI component provides a means for the manual input of the process parameter limits. In addition, a factory level controller can provide limits for process parameters for each process module.

The controller can receive and execute models created by commercially available modeling software. For example, the controller can receive and execute models that were created by external applications and sent to the controller.

The controller 120 can comprise one or more filters (not shown) to filter the metrology data in order to remove the random noise. An outlier filter can be used to remove outliers that are statically not valid and should not be considered in the calculation of the mean of a wafer measurement. A noise filter can be used to remove random noise and stabilize the control loop, an Exponentially Weighed Moving Average (EWMA) or Kalman filter can be applied.

In one embodiment, controller 120 can be used to run FDC applications and can send and/or receive information concerning an alarm/fault condition. For example, the controller can send and receive FDC information to and from a factory level controller or a tool level controller. In addition, FDC information can be sent via the e-Diagnostics network, e-mail, or pager after the identification of an exception condition. In an alternate embodiment, FDC applications can be run on different controllers.

The controller 120 can take various actions in response to an alarm/fault, depending on the nature of the alarm/fault. The actions taken on the alarm/fault can be based on the business rules established for the context specified by the system recipe, process recipe, module type, module identification number, load port number, cassette number, lot number, control job ID, process job ID, and/or slot number. In one embodiment, the controller determines the actions to take. Alternately, the controller can be instructed to take some specific actions by the FDC system.

The controller can comprise a database component for archiving input and output data. For example, the controller can archive received inputs, sent outputs, and actions taken by the controller in a searchable database. In addition, the controller can comprise means for data backup and restoration. In addition, the searchable database can include model information, configuration information, and historical information and the controller can use the database component to backup and restore model information and model configuration information both historical and current.

The controller can comprise a web based user interface. For example, the controller can comprise a web enabled GUI component for viewing the data in the database. The controller can comprise a security component that can provide for multiple levels of access depending on the permissions granted by a security administrator. The controller can comprise a set of default models that are provided at installation time, so that the controller can reset to default conditions.

The controller has the capability of managing multiple process models that are executed at the same time and are subject to different sets of process recipe constraints. The controller can run in three different modes: simulation mode, test mode, and standard mode. A controller can operate in simulation mode in parallel with the actual process mode. In addition, FDC applications can be run in parallel and produce real-time results.

When the semiconductor processing system includes a host system and one or more processing systems, the host system can operate as the master system and can control and/or monitor a major portion of the processing operations. The host system can create a process sequence, and can send the process sequence to the processing system. In one embodiment, the process sequence can comprise a sequence of measurement module visits and processing module visits. A process job (PJ) can be created for each measurement module visit and each processing module visit.

In addition, virtual measurements can be made when a processing system controller executes a simulation model. The results from simulation model executions can be stored and used to predict potential fault conditions.

Figure 2:
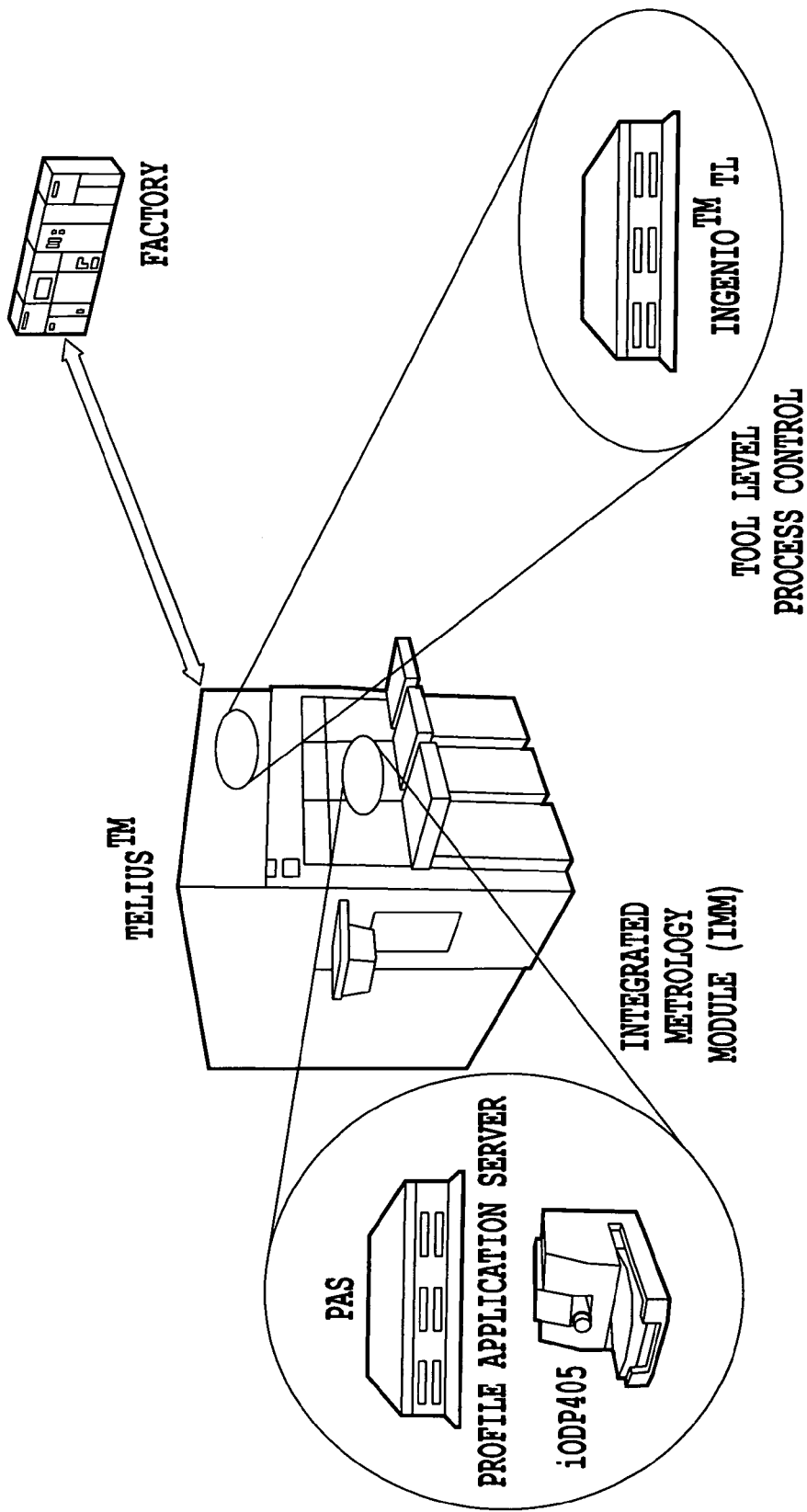
FIG. 2 shows a simplified block diagram of an integrated processing system in accordance with an embodiment of the invention.

FIG. 2 shows a simplified block diagram of an integrated processing system 100' in accordance with an embodiment of the invention. In the illustrated embodiment, a processing system (TELIUS™) is shown that comprises a processing tool, an integrated metrology module (IMM), and a tool level Advanced Process Control (APC) controller. As would be appreciated by those skilled in the art, the components of the integrated processing system 100' are intended merely to be exemplary of the system of the present invention. As would be appreciated by those skilled in the art, and as will be made apparent from the discussion that follows, the permutations of combinations of components for the present invention is significant. Each such variation, while not discussed herein, is intended to fall within the scope of the present invention.

The system 100', such as shown in FIG. 2, can provide IMM wafer sampling and the wafer slot selection can be determined using a (PJ Create) function. The R2R control configuration can include, among other variables, feed-forward control plan variables, feedback control plan variables, metrology calibration parameters, control limits, and SEMI Standard variable parameters. Metrology data reports can include wafer, site, structure, and composition data, among others, and the tool can report actual settings for the wafer.

The IMM system can include an optical measuring system such as a Timbre Technologies' Optical Digital Profilometry (ODP) system that uses spectroscopic ellipsometry, reflectometry, or other optical instruments to measure true device profiles, accurate critical dimensions (CD), and multiple layer film thickness of a wafer. Timbre Technologies, Inc is a California corporation and wholly owned subsidiary of TEL.

The process is executed in-line, which eliminates the need to break the wafer for performing the analyses. ODP can be used with the existing thin film metrology tools for inline profile and CD measurement, and can be integrated with TEL processing tools to provide real-time process monitoring and control. An ODP Profiler can be used both as a high precision metrology tool to provide actual profile, CD, and film thickness results, and a yield enhancement tool to detect in-line process excursion or process faults.

An ODP™ solution has three key components: ODP™ Profiler™ Library comprises an application specific database of optical spectra and its corresponding semiconductor profiles, CDs, and film thicknesses. Profiler™ Application Server (PAS) comprises a computer server that connects with optical hardware and computer network. It handles the data communication, ODP library operation, measurement process, results generation, results analysis, and results output. The ODP™ Profiler™ Software includes the software installed on PAS to manage measurement recipe, ODP™ Profiler™ library, ODP™ Profiler™ data, ODP™ Profiler™ results search/match, ODP™ Profiler™ results calculation/analysis, data communication, and PAS interface to various metrology tools and computer network.

A control system, such as the Ingenio system from Tokyo Electron Limited, can comprise management applications, such as a recipe management application. For example, the recipe management application can be used to view and/or control a recipe stored in the Ingenio system database that is synchronized with equipment via a network environment from the Ingenio system. An Ingenio client can be placed separately at a distance from the factory, and can provide comprehensive management functions to multiple equipment units.

Recipes can be organized in a tree structure that can comprise recipe sets, classes, and recipes that can be displayed as objects. Recipes can include process recipe data, system recipe data, and IMM recipe data. Data can be stored and organized using a recipe set. The IMM recipes that are on the processing tool can be used to determine wafer sampling and a relationship between slots and IM recipes. IM recipes can exist on IM measurement hardware, can be selected in Telius IMM recipes, can contain pattern recognition information, can be used to identify the chips to sample on each wafer, and can be used to determine which PAS recipe to use. PAS recipes can be used to determine which ODP library to use, and to define the measurement metrics to report, such as CD, side wall angle (SWA), thickness, trench width, and goodness of fit (GOF).

The Ingenio system can include APC applications that can operate as control strategies, and a control strategy can be associated with a processing tool recipe, such as an etching tool recipe. Wafer level context matching at runtime allows for custom configuration by wafer (slot, waferID, lotID, etc.). A control strategy can include one or more control plans, and a process module and/or measurement module that is being controlled has at least one control plan defined for a visit to the process module and/or measurement module. Control plans can contain models, control limits, targets, and can include static recipes, formula models, and feedback plans.

A control strategy can be used to establish a system recipe and processing tool; to determine control plans; to establish an action in response to a failure; to establish context; to establish a control type (standard, simulated or test); to establish a control action (enabled/disabled); and to establish a control state (protected/unprotected).

Control plans can cover multiple process steps within a module, and can be controlled by the factory. Parameter ranges can be defined for each process and/or measurement module, and variable parameter "Limit Ranges" are provided for each control parameter.

The Ingenio system can include APC applications that can operate as analysis strategies, and an analysis strategy can be used to analyze the collected data, and establish error conditions. An analysis strategy can be executed when a context is matched. During the execution of an analysis strategy, one or more analysis plans can be executed. For example, univariate SPC models/plans may be executed, and may trigger SPC alarms; PCA and/or PLS models/plans may be executed, and may trigger SPC alarms; multivariate SPC models/plans may be executed, and may trigger SPC alarms; and other file output plans may be executed, and may trigger software alarms.

A plan can create an error when a data failure occurs, an execution problem occurs, or a control problem occurs. When an error occurs, the plan can generate an alarm message; the parent strategy status can be changed to a failed status; the plan status can be changed to a failed status; and one or more messages can be sent to the alarm log and the FDC system. When a feed forward plan or a feedback plan fails, one or more of the plans in the parent strategy may be terminated, and their status can be changed to a failed status. In one case, when a bad incoming wafer is detected, a control plan can detect and/or identify this as a faulty incoming wafer. In addition, when a feedback plan is enabled, the feedback plan can skip a wafer that has been identified to be defective and/or faulty by another plan. A data collection plan can reject the data at all the measurement sites for this wafer or reject the data because the GOF is low.

In one embodiment, feedback plan failure may not terminate the strategy or other plans. Successful plans and/or strategies do not generate any error/alarm messages.

Pre-specified failure actions for strategy and/or plan errors can be stored in a database, and can be retrieved from the database when an error occurs. Failure actions can include use the nominal process recipe for this wafer and module; use a null process recipe for this wafer and module; pause the process module and wait for intervention; pause the whole tool and wait for intervention. For example, a processing tool may take action only when the wafer with the error reaches the target process module where the R2R failure occurred, and the processing tool may be able to continue processing other lots, recipes, or wafers in other modules.

The Ingenio system can include an FDC system that includes applications for managing alarm/fault conditions. When an alarm and/or fault condition is detected, an FDC application in the FDC system can send a message to one or more processing modules and/or tools. For example, a message can be sent to pause the current process or to stop the current process. In one case, a tool pause/stop can be done by changing the value of the maintenance counter.

The FDC system can detect faults, predict tool performance, predict preventative maintenance schedules, decrease maintenance downtime, and extend the service life of consumable parts in the processing tool. The FDC system collects data from the tool and additional sensors, calculates summary parameters, performs Multivariate Analysis (MVA), and compares the results with normal operation using Statistical Process Control (SPC). For example, the SPC component can perform a series of Western Electric run-rule evaluations, and generates an SPC alarm if a run-rule is violated.

The operations of the APC system and the FDC system can be configured by the customer and can be based on the context of the wafers being processed. Context information includes recipe, lot, slot, control job, and process job. The user interfaces for APC system and the FDC system are web-enabled, and provides a near real time tool status and a real time alarm status display.

All data and actions taken by the APC system and the FDC system are posted to a relational database. The historical database provides a searchable record of tool processing including: trace parameters, summary parameters, SPC limits, SPC run-rule violations, alarms, errors, faults, exceptions, and notifications. In addition, data visualization tools are provided to view and overlay trace and summary data from single and multiple wafers. Wafer selection is provided by a data explorer that allows wafer data to be selected and sorted before charting. In addition, once a fault is detected, the user can "drill down" to successive layers to further inspect the data and characterize the source of the fault.

When control and/or operational data is sent by a host system to the controller, errors and/or alarms related to that data can be sent to the host system. For example, when an invalid control strategy and/or plan name is sent, an error may be returned to the host system; when invalid processing parameters and/or limits are sent, an error may be returned to the host system; and when invalid processing sequence and/or recipe is sent, an error may be returned to the host system.

Alarms and/or fault conditions may be viewed and/or cleared using a client workstation, or a host system workstation. A warning can be displayed when a mismatch occurs between the client version and the host version. An administrator screen and/or mailbox may be used to display the alarm emails and the diagnostic emails that have been sent by the FDC system. Wafer information, such as wafer_id, run_id, and/or slot_id, may be stored and displayed to identify the correct wafer that generated the alarm.

The FDC system can include alarm/faults associated with the interactions between the R2R controller and the various processing modules used before, during, and/or after a wafer is processed. For example, an alarm can be associated with a connection problem, an adjustment problem, a timeout problem, a recipe problem, and/or a verification problem. The FDC system can determine the response to the alarm. For example, the response can include allowing the processing module to continue with the process sequence, pausing the process sequence, altering the process sequence, and/or stopping the process sequence. Actions can be executed immediately, executed after a wafer has finished processing, and/or executed after a lot has finished processing. Actions can be based on rules provided by the host, and the rules may be part of an analysis strategy. In addition, the FDC system can provide a message that classifies the alarm/fault and/or recommends maintenance action.

The R2R controller and the associated software can produce alarms and the FDC system can evaluate the R2R alarms to determine when to declare a fault condition. Some of the alarms can be informational, and the FDC system does not declare a fault condition for each alarm.

An R2R controller can include an R2R Status Field item, and its value can be used to provide status and/or alarm data to another controller, such as an FDC and/or host controller. For example, the value can include COMPLETED_FAILURE, CONTROL_FAILURE, DATA_FAILURE, FEEDBACK_FAILURE, ABORTED, AWAITING_DATA, READY, EXECUTING, NEW, RECIPE_READY, COMPLETED_SUCCESS, or UNPROCESSED, or other text. The R2R Status Field item can be used to report the current execution state of one or more control plans and to report the current execution state of one or more wafer control strategies.

Business rules can be used to determine what to do with the wafer when an alarm is generated or the FDC system declares a fault condition. For example, keep the wafer in the processing tool until it can be determined whether the processing of that wafer can continue in the processing module without damaging the wafer, move the wafer to a holding position, such as in a transfer chamber, move the wafer to a measurement module, or move the wafer out of the system. In some cases, a process recipe can be sent to the processing tool in response to an error, such as an alarm or a fault condition. For example, a normal process recipe can be sent to the tool, or a null recipe can be sent to the tool, or a recover recipe can be sent to the tool. In one case, when a bad incoming wafer (missing photo resist, CD out of trim range) is detected, a control plan can detect and/or identify this as a faulty incoming wafer and run a null recipe on the module. In addition, the MES can be notified that the wafer was not processed and the wafer can then be reworked in the lithography tool.

The Ingenio system includes a data recovery application. For example, when the APC system and/or the FDC system becomes disconnected from the tool for some period of time, the tool can continue to process wafers normally and store data in files on the tool's hard drive. However, because the APC system and/or the FDC system is not connected no data is stored in the APC system and/or the FDC system database. Upon reconnecting, the APC system and/or the FDC system scans the data stored on the tool's hard drive and posts the missing data in the APC system and/or the FDC system database.

The FDC system can execute an FDC model at run time, for every wafer that matches the analysis strategy. SPC models/plans use single variable techniques, and do not include the simultaneous interactions between variables. MVA models/plans use multiple variables and their interactions. PCA techniques can be used to determine if a process is "normal", and PLS techniques can be used to predict an output based on inputs.

The mathematical output(s) of the model can be placed in SPC chart for run-rule evaluation. For example, an SPC chart may go into violation and cause an alarm when a process is not "normal" (PCA alarm), or when a predicted output is out of spec (PLS alarm). Also, when the system encounters an error in a data exchange, a software alarm can be caused. Alarms may be displayed in a sub-panel of a GUI screen as well as in the alarm log.

The FDC system can include an SPC Auto Configuration application that can automatically create and/or populate an SPC chart for one or more of the enabled parameters. The SPC chart can be labeled with tool, module, recipe, step, parameter, and summary function, and the SPC limits can be based on setpoints, the initial set of data, or fixed predetermined limits for each parameter. In addition, the application can create an analysis strategy for the specific module and recipe that can execute the SPC plan for future runs. The FDC system can include an AutoTemplate SPC Plan that can serve as a template and can be edited to define the alarm-handling options that will be copied to newly created SPC plans. The AutoTemplate SPC Plan reduces the amount of time required for manual configuration of the system; enables the system to calculate intelligent limits for parameters automatically based on either current recipe set points or data points added to the chart; allows the system to create SPC charts for new recipes automatically without requiring the user to prepare the configuration in advance; and can be context driven.

Each FDC item can have a name field associated with it, and each FDC item will have a unique name. Each FDC item can also have a unique result field associated with it, such as an FDC Result field. The result field can comprise a status indication.

When an alarm is generated, the FDC system can perform a notification and/or intervention. Notification can be via e-mail, pager, cell phone, or other wireless device. Notifications can be configured by person, by day, and by time of day. For example, in some cases, the process and maintenance personnel who are scheduled to be at work will receive the notification. For example, one or more GUI screens (not shown) can be provided for the tool operator, the process engineer on a workstation, and a host monitor. The GUI display can show the position for the wafer during the paused process, and can show the current process positions for other wafers in other processing modules that are not paused.

When a fault condition is declared, one or more of the fault messages that are sent by the FDC system can contain a fault system identifier. For example, a field engineer can contain a fault system identifier to determine what the most likely cause of the error is. The fault system identifier is a combination and alphanumeric characters that identifies the cause/solution of an error/alarm. The database shall have a field for the matrix system identifier. The alarm log can be sorted using the fault system identifier, the date/time, the alarm level, the recipient, the tool, the process module, and/or the alarm message.

In addition, the FDC system can perform an intervention that can include at least one of: pausing the processing tool at the end of the current lot, pausing the processing tool at the end of the current wafer, pausing the processing module at the end of the current lot, pausing the processing module at the end of the current wafer, rerouting the wafer/lot to a different tool, or rerouting the wafer/lot to a different module.

Figure 3:
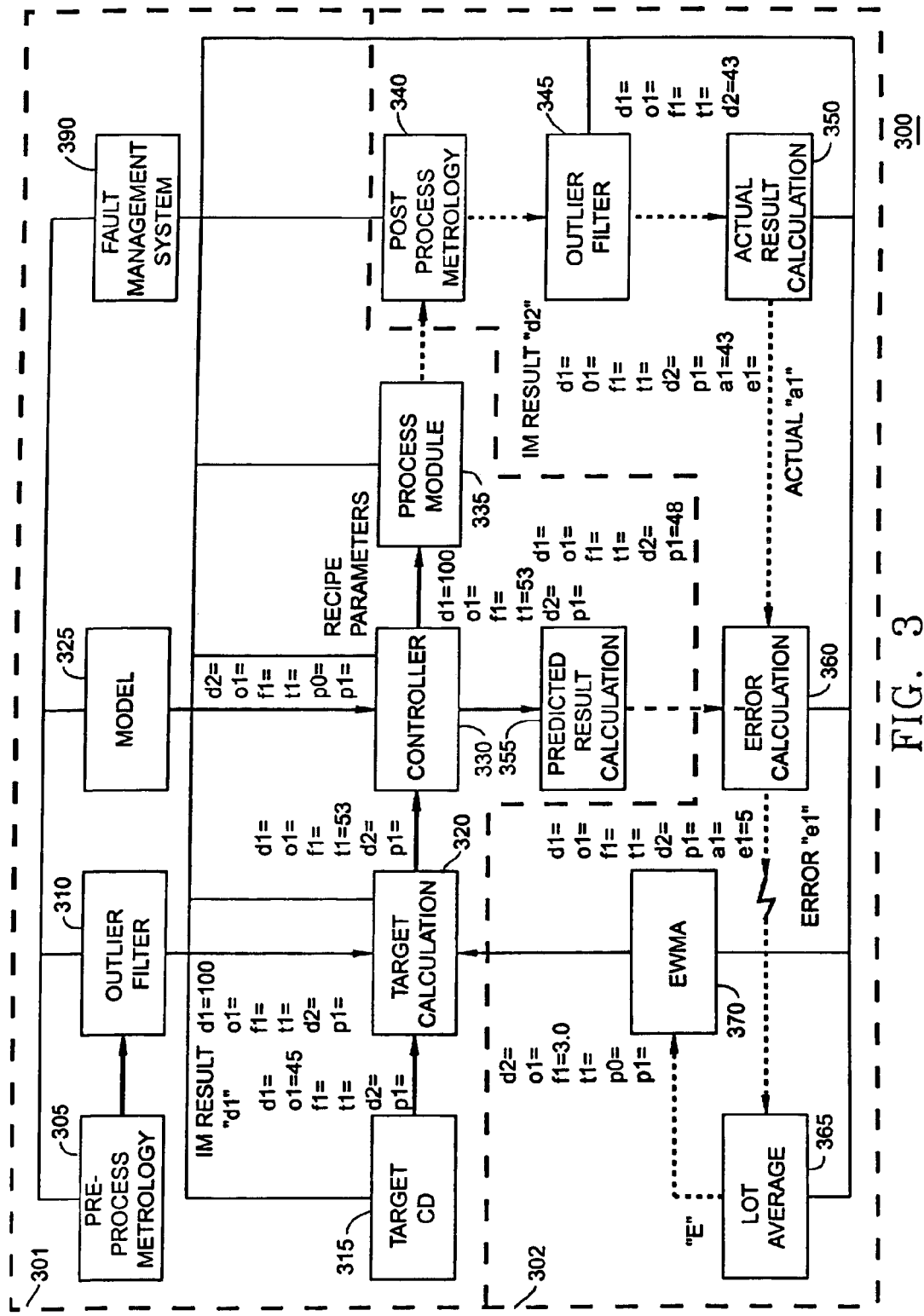
FIG. 3 shows a simplified flow diagram for a fault management process in accordance with an embodiment of the invention.

FIG. 3 shows a simplified flow diagram for a fault management process in accordance with an embodiment of the invention. In the illustrated embodiment, a feedforward/feedback process is shown, but this is not required. In alternate embodiments, other configurations can be used.

Pre-process data element 305 can include functions, such as receiving data, processing data, storing data, and sending data. Data can include input data, output data, processed data, historical data, tool/module data, and alarm data. For example, the data can include pre-process and/or post-process metrology data, and the metrology data can include site measurement data and wafer data. Site measurement data consists of the following items: Goodness Of Fit (GOF), Grating Thickness, Critical Dimension (CD), Material Thickness, Material Cross Section Area, Trench Cross Section Area, Sidewall Angle, Differential Width, Site Result, and Site number. Wafer data consists of the following items: CD Measurement Flag, Number of Measurement Site, Recipe Result, Coordinate X, and Coordinate Y. Pre-process data are can be used for feed forward control, and post-process data can be used for feedback control. Also, the data can be summarized as the statistical value for the control wafer according to some business rules.

The pre-process data element 305 can generate alarm data when data is processed by a pre-process data element 305. The fault management system 390 can receive alarm data from the pre-process data element 305 and can use the alarm data to declare a fault condition. The fault management system can send a fault message to pre-process data element 305, and pre-process data element 305 can respond to the fault message by halting one or more software applications, by storing data, by re-setting one or more software applications, and by attempting to clear one or more alarms.

Data filter element 310 can include functions, such as filtering input data, output data, processed data, historical data, tool/module data, and/or alarm data. In one embodiment, a EWMA filter can be used. For example, the data filter element 310 can include an outlier rejection filter that can remove outliers that are statistically not valid. In other words, data that are not reliable can be thrown away and is not considered in the calculations. Business rules can be used in the filtering process to ensure the filtered data is reliable. In addition, business rules can be used to determine how the FDC system processes the unfiltered and filtered data. The FDC system rules can be used to determine which data is filterable data, which data is outlier data, and which data indicates an alarm condition.

The data preprocessing applications can be updated with data from the first wafer from each lot, with data from each wafer in a lot, with wafer average data, with lot average data, or with wet cleaning cycle data. In addition, rules can be established to compensate for changes in the OES data caused by deposition on the chamber walls.

The data filter element 310 can generate alarm data when data is filtered. The fault management system 390 can receive error data from the data filter element 310 and can use the error data to declare an alarm condition. The fault management system can send a fault message to data filter element 310, and data filter element 310 can respond to the fault message by halting one or more software applications, by storing data, by re-setting one or more software applications, and by attempting to clear one or more alarms. For example, filtering limits may be changed in response to an alarm and/or fault condition.

Target data element 315 can include functions, such as receiving the desired process result data, verifying the process result data, storing desired process result data, and scaling the desired process result data. Target data can include input data, output data, processed data, historical data, tool/module data, and alarm data. For example, the data can include pre-process and post-process metrology data, and the metrology data can include site measurement data and wafer data. In addition, the data can include rules data from a host system that is used to verify and/or scale the data.

The target data element 315 can generate alarm data when data is not received and/or not verified. The fault management system 390 can receive alarm data from the target data element 315 and can use the alarm data to declare a fault condition. The fault management system can send a fault message to the target data element 315, and target data element 315 can respond to the fault message by halting one or more software applications, by storing data, by re-setting one or more software applications, and by attempting to clear one or more alarms. For example, the target data element 315 may request a data sender to resend the data.

In one embodiment, the target data can be a target CD data. The target CD data can be applicable to one or more CDs located at one or more locations on a wafer. The position data, size data, and limit data can be provided for each measurement site on the wafer. For example, the measurement sites are known in advance, and are consistent with the target CD data. In alternate embodiments, the target data may be a depth, a sidewall angle, or a thickness.

The source of target data can be identified in advance. For example, data sources can be external data sources, such as host or factory sources, or internal sources, such as internal measurement devices associated with a processing tool. The rules for verifying and/or scaling data from external or internal sources can be different. GUI screens can be provided for viewing processes associated with the target data element 315.

The Target Calculation element 320 conducts the target calculation. For example, the target calculation can be set equal to the data source item. Alternately, an equation may be entered that correlates one set of data with another set of data. In addition, target calculation may comprise an additional compensation term. For example, the additional compensation factor can be used to correct for errors introduced in another step, such as a photo resist step. A new target value can be a variable that is calculated at or before run time, and an equation can be used to calculate the target value.

Process result calculation element 350 can include functions, such as receiving feedforward data and verifying the feedforward data. The feedforward data can include input data, output data, processed data, historical data, tool/module data, and alarm data. For example, the data can include pre-process and post-process metrology data, and the metrology data can include site measurement data and wafer data. In addition, the data can include rules data from a host system that is used to verify and/or scale the data.

Process result calculation element 350 can include functions, such as receiving the target data and processing the target data, storing desired process result data, and scaling the desired process result data.

The process result calculation element 350 can determine a desired process result using a difference between the measurement data and the target data. In addition, the process result calculation element 350 can use rules data from a host system to determine a desired process result.

The process result calculation element 350 can generate alarm data when there is a calculation error or when data is not received. The fault management system 390 can receive alarm data from the process result calculation element 350 and can use the alarm data to declare a fault condition. The fault management system can send a fault message to the process result calculation element 350, and process result calculation element 350 can respond to the fault message by halting one or more software applications, by storing data, by re-setting one or more software applications, and by attempting to clear one or more alarms. For example, the process result calculation element 350 may recalculate a result.

In one embodiment, the desired process result can be a difference between measurement data and target CD data. Because the desired process result is defined by the to-be-controlled process for each wafer, the desired process result can be also defined by the to-be-controlled process chamber/module. Hence, each desired process result can be associated with the respective control strategy/plan. The desired process result value for each control strategy/plan can be specified before a wafer or lot start.

For example, a target CD can be compared to pre-process metrology data. When the pre-process metrology data is less than the target CD, an error can be declared. When the pre-process metrology data is approximately equal to the target CD, a "null" condition can be declared. When the pre-process metrology data is greater than the target CD, a trim amount can be established. The trim amount to be removed during a process can be regarded as the desired result if the process model which contains the relationship between trim amount and recipe parameters has been verified.

Model element 325 can include functions, such as process model generation, process model verification, process model updating, and simulation using process models. In addition, the data can include rules data from a host system that is used to generate, verify, and/or update a process model.

A process model can represent a verified relationship between a desired result and the process variables needed to achieve the desired result. Process models can be classified as two types, theoretical type or empirical type. Empirical models can be formula-based models and/or table-based models. For example, formula-based models may use regression equations with constraints based on some evaluated experimental data. Formula-based models can be continuously updated using results with recipe variables based on some evaluated experimental data. Formula-based models can be regarded as a smoothing model without noise. Table-based models can use tables that contain the piecewise associations of desired results with recipe variables based on some evaluated experimental data. Table-based models can be regarded as optimized models with minimized noise.

Process models can be linear or non-linear. When a non-linear process can be represented as a combination of some linear processes on some respective limited spaces, a non-linear process can be implemented as some limited linear models with respect to some constraints of each space. In addition, an optimal model can be created for one or more different chamber states, and model optimizer applications can be used to update models based on chamber characteristics that change over time.

Process controller element 330 can include functions, such as receiving data, determining recipe parameters, and calculating predicted result data. The received data can include input data, output data, processed data, historical data, tool/module data, alarm data, desired process result data, and model data. In addition, the data can include rules data from a host system that is used to determine the recipe parameters.

Process controller element 330 can include functions, such as receiving the target data and processing the target data, storing desired process result data, and scaling the desired process result data.

The process controller element 330 can determine a desired process result using a difference between the measurement data and the target data. In addition, the process controller element 330 can use rules data from a host system to determine a desired process result.

The process controller element 330 can generate alarm data when there is a calculation error or when data is not received. The fault management system 390 can receive alarm data from the process controller element 330 and can use the alarm data to declare a fault condition. The fault management system can send a fault message to the process controller element 330, and process controller element 330 can respond to the fault message by halting one or more software applications, by storing data, by re-setting one or more software applications, and by attempting to clear one or more alarms. For example, the process controller element 330 may recalculate a result.

The process controller 330 can be used as a process model manager that manages the process models and selects the best-fit model for solving the recipe parameters. The process controller 330 can be used as a recipe parameters solver that produces recipe parameters according to the best-fit process model and model constraints. In addition, the process controller 330 can be used as a process model optimizer that updates or adjusts the active process model according to the process trend input.

The process controller 330 can use the desired process result input and resolve it as the possible/reachable/predicted process result depending on the process model and constraint. In addition, the process controller 330 can be used to manage the multi-layer process models with constraints and to update the active process model according to the process trend input.

The process controller 330 can generate alarm data when there is a calculation error or when data is not received. The fault management system 390 can receive alarm data from the process controller 330 and can use the alarm data to declare a fault condition. The fault management system can send a fault message to the process controller 330, and process controller 330 can respond to the fault message by halting one or more software applications, by storing data, by re-setting one or more software applications, and by attempting to clear one or more alarms. For example, the process controller 330 may recalculate a recipe.

Recipe parameters can include recipe set points (control variables), that can be sent from a process controller 330 to a process module 335 for merging with the process recipe and processing the wafer. In one case, a nominal recipe can be used, and a nominal recipe can be a process recipe before modification. For example, a nominal recipe can also be a base reference recipe for the associated control recipes or control models, containing information on measurement nominal input and desired result output regardless of chamber state.

When either the process controller 330 or the process module 335 detects a control failure, an alarm can occur. For example, recipe selection failure, recipe reception timeout, integration communication failure, and synchronization failure can cause an alarm to occur. When control failure occurs, an alarm can be sent to the fault management system 390, and the fault management system 390 can determine a response. Responses can include: use the tool process recipe; bypass without processing; stop the process controller procedure; stop the process module processing, continue to process the wafer; and continue to process the lot.

The wafer can be processed using the recipe parameters determined by the process controller 330. The process module 335 can be an etch module, deposition module, or a measurement module, or a combination of two or more thereof. For example, the process module 335 can be an etch process chamber or a etch process tool with several etch process chambers, under R2R control. The etching process contains the characteristics of process shift and drift depending on the maintenance cycle and chamber state. Alternately, a trimming procedure can be performed using a processing subsystem (process ship) that can comprise a COR module, a PHT module, and at least one buffer module.

The fault management system 390 can process both feedforward errors and feedback errors. The feedforward errors can occur in one or more of the feedforward elements 301. The feedforward elements 301 can collect data, process data, compare data to a desired result, and declare an error when the desired result is not achieved. The fault management system 390 can examine the feedforward errors and can use one or more feedforward errors to classify a fault. Severity levels can be established for different feedforward errors or groups of feedforward errors. The feedback errors can occur in one or more of the feedback elements 302. The feedback elements 302 can collect data, process data, compare data to a desired result, and declare an error when the desired result is not achieved. The fault management system 390 can examine the feedback errors and can use one or more feedback errors to classify a fault. Severity levels can be established for different feedback errors or groups of feedback errors. In addition, the fault management system 390 can examine the feedforward errors and the feedback errors and can use a combination of feedforward errors and the feedback errors to classify a fault. For example, severity levels can include a log level, a notify level, a notify and pause level, and a notify and stop level.

Post-process data element 340 can include functions, such as generating data, receiving data, processing data, storing data, and sending data. Data can include input data, output data, processed data, historical data, tool/module data, and alarm data. For example, generated data can include post-process metrology data, and the metrology data can include site measurement data and wafer data. Site measurement data consists of the following items: Goodness Of Fit (GOF), Grating Thickness, Critical Dimension (CD), Material Thickness, Material Cross Section Area, Trench Cross Section Area, Sidewall Angle, Differential Width, Site Result, and Site number. Wafer data consists of the following items: CD Measurement Flag, Number of Measurement Site, Recipe Result, Coordinate X, and Coordinate Y. Post-process data are can be used for feedback control, and the feedback process can be controlled using business rules.

The post-process data element 340 can generate alarm data when data is generated and/or processed by a post-process data element 340. The fault management system 390 can receive alarm data from the post-process data element 340 and can use the alarm data to declare a fault condition. The fault management system can send a fault message to post-process data element 340, and the post-process data element 340 can respond to the fault message by halting one or more software applications, by re-generating data, by storing data, by re-processing data, by re-setting one or more software applications, and by attempting to clear one or more alarms.

Data filter element 345 can include functions, such as filtering post-processed data, and/or historical data. In one embodiment, a EWMA filter can be used. For example, the data filter element 345 can include an outlier rejection filter that can remove outliers that are statistically not valid. Data that is not reliable are not used in the calculations. Business rules can be used in the filtering process to ensure the filtered data is reliable. In addition, business rules can be used to determine how the FDC system processes the unfiltered and filtered data. The FDC system rules can be used to determine which data is filterable data, which data is outlier data, and which data indicates an alarm condition.

The data post-processing applications can be updated with data from the first wafer from each lot, with data from each wafer in a lot, with wafer average data, with lot average data, or with wet cleaning cycle data. In addition, rules can be established to compensate for changes in the OES data caused by deposition on the chamber walls.

The data filter element 345 can generate alarm data when data is filtered. The fault management system 390 can receive alarm data from the data filter element 345 and can use the alarm data to declare a fault condition. The fault management system can send a fault message to data filter element 345, and data filter element 345 can respond to the fault message by halting one or more software applications, by storing data, by re-setting one or more software applications, and by attempting to clear one or more alarms. For example, filtering limits may be changed in response to an alarm and/or fault condition.

Actual process result calculation element 350 can include functions, such as determining an actual process result. For example, the measured target CD can be one of the actual process results from a process or process step, or the measured trim amount during a process can be regarded as the actual process result.

Predicted result calculation element 355 can include functions, such as determining a predicted process result. For example, the input data and a process model can be used to determine a predicted process result. A predicted process result can be used to differentiate modeling errors from other sources of error such as process drift and measurement error.

An error calculation element 360 can be used to calculate an offset between a predicted result and an actual result, an offset between a historical result and an actual result, and/or an offset between a desired result and an actual result.

A lot average element 365 calculates a lot average that may be used as an input to the EWMA filter 370. In alternate embodiments, different averages may be used and may be based on wafers, lots, and/or batches.

The process error serves as input to the EWMA filter 370 and the filtered output is applied to the process as feedback in order to improve the accuracy of the process result.

The precision of the actual process result is subject to random noise sources that occur at various places in the controller. For example, measured data are subject to random noise that when repeatedly sampled has a Gaussian or "normal" distribution. Alternately, other distributions of noise, such as bi-modal, are possible. The EWMA filter can be used to remove the random noise from the feedback loop and hence improve the precision of the controller.

The accuracy of the process depends on both the precision of the measurements, the amount of random noise induced by the process, the quality of the process model and the systematic changes in the process. Two types of systematic changes are included in this simulation; a slow drift that is typical during the maintenance cycle of an etcher and a sudden jump in the process that may occur after a cleaning cycle.

The EWMA filter 370 can be described by the following equation:

$$Y(n)=\mu Y(n-1)+(1-\mu)X(n)$$

where X is the input to the filter and Y is the output of the filter. The value of $\mu$ is constrained to be between zero and one, with zero have no filtering affect and one having the most filtering affect. The value for Y(0) is usually set to the nominal value for the EWMA output. In the case of the controller, where the input of the EWMA filter is an error signal, the initial value can be set to zero.

The primary purpose of the feedback loop is to improve the accuracy of the process result by compensating for systematic changes in the process.

EWMA filtering offers a conceptually and computationally simple technique for reducing random noise in a process. The amount of filtering applied by the filter is controlled by the value of a constant $\mu$ which can be set between the values of zero and one. A side effect of the EWMA filtering technique is that it delays the response on the controller to systematic changes in the process.

The EWMA 370 can provide a compromise between filtering of random noise sources and response to systematic process changes. EWMA filtering introduces a bias in the process when it is used in a feedback loop in the presence of a constant drift. The factor $\mu$ can be adjusted according to the magnitude of the random noise sources and the magnitude of changes in the process.

The output of EWMA filter 370 can be provided to the process result calculation element 350. The process result calculation element 350 can use this feedback data when performing future calculations. The data can be fed back on a wafer-to-wafer time constant or a lot-to-lot time constant.

The output of the EWMA filter 370 can be an offset, and the offset can be an estimate of the amount of process error. The offset can represent a process trend and can be used to optimize the process model and recipe parameters.

The performance of the controller can be represented by the mean and standard deviation of the residual error present in the feedback loop.

Fault detection is performed by periodically measuring a set of parameters which represent, either directly or indirectly, the operation of a process such shown in FIG. 3. The parameters can be either directly related to the process recipe set points or dependent on the process recipe set points. For example, the chamber pressure in a typical process module can be represented by the process recipe pressure setpoint and by the measured process pressure. For the purpose of fault detection, it is reasonable to set process limits of five or less percent, and when the parameter exceeds the process limits, an alarm can be generated and the process can be stopped or other action taken depending on the business rules established for the FDC system.

When a control and/or analysis strategy is associated with a feed forward element 301, then the strategy can comprise a feedforward FDC plan. For example, the feedforward FDC plan can be executed after a start event, such as a wafer-in event, a process start event, or a recipe start event occurs. When a control and/or analysis strategy is associated with a feedback element 302, then the strategy can comprise a feedback FDC plan. For example, the feedback FDC plan can be executed after a stop event, such as a wafer-out event, a process stop event, or a recipe stop event occurs. The plan execution can be rule based and comprise SQL statements. A feedforward FDC plan and a feedback FDC plan can be part of an FDC system.

When an error and/or alarm is detected in a feedforward FDC plan, a first level alarm message can be sent to an intervention manager, and the intervention manager can process the first level alarm messages. When an error and/or alarm is detected in a feedback FDC plan, a second level alarm message can be sent to an intervention manager, and the intervention manager can process the second level alarm messages.

The feedforward FDC plan and the feedback FDC plan can operate independently. Each FDC plan does not need to know the actions in other FDC plans. As a result, there can be some redundancy or inconsistency in actions, and the intervention manager can be used to resolve any problems.

The relationship between the process results and the process recipe parameter set points used by a controller, such as an R2R controller, to control the process, is given by the process model. Process models can be linear, quadratic, or full quadratic.

The data acquisition required to build an FDC model can be performed at the same time as the DOE is executed to collect the data necessary to build the process model. The data required to build the FDC model, called the training set, includes the process recipe set points as well as the resultant dependent parameters. Since the DOE normally spans the allowable range of control for the controller, the resultant training set will also span the range of data expected from subsequent process runs, including those runs where the controller is operating.

Once the training set has been analyzed using the techniques of PLS and the FDC model is obtained, the model is then transferred to the FDC system. The FDC model can be activated to run when the controller is operating based on the context of the incoming material. Both FDC models and the process recipes may be stored in a database in memory.

The FDC models and the process recipes are dynamic and can be updated through the process. Both historical and updated FDC models and process recipes may be stored in a database in memory. The R2R controller can change a recipe set point before, during, or after a process is performed, and the recipe set point can be an input to an FDC model. The modification of the set point can affect the validity of the FDC model. In one embodiment, the FDC model can be automatically normalized around the set point in order to remain valid. For example, a normalized FDC model can be used that is defined as a ratio of actual setpoint to the nominal set point.

Figure 4:
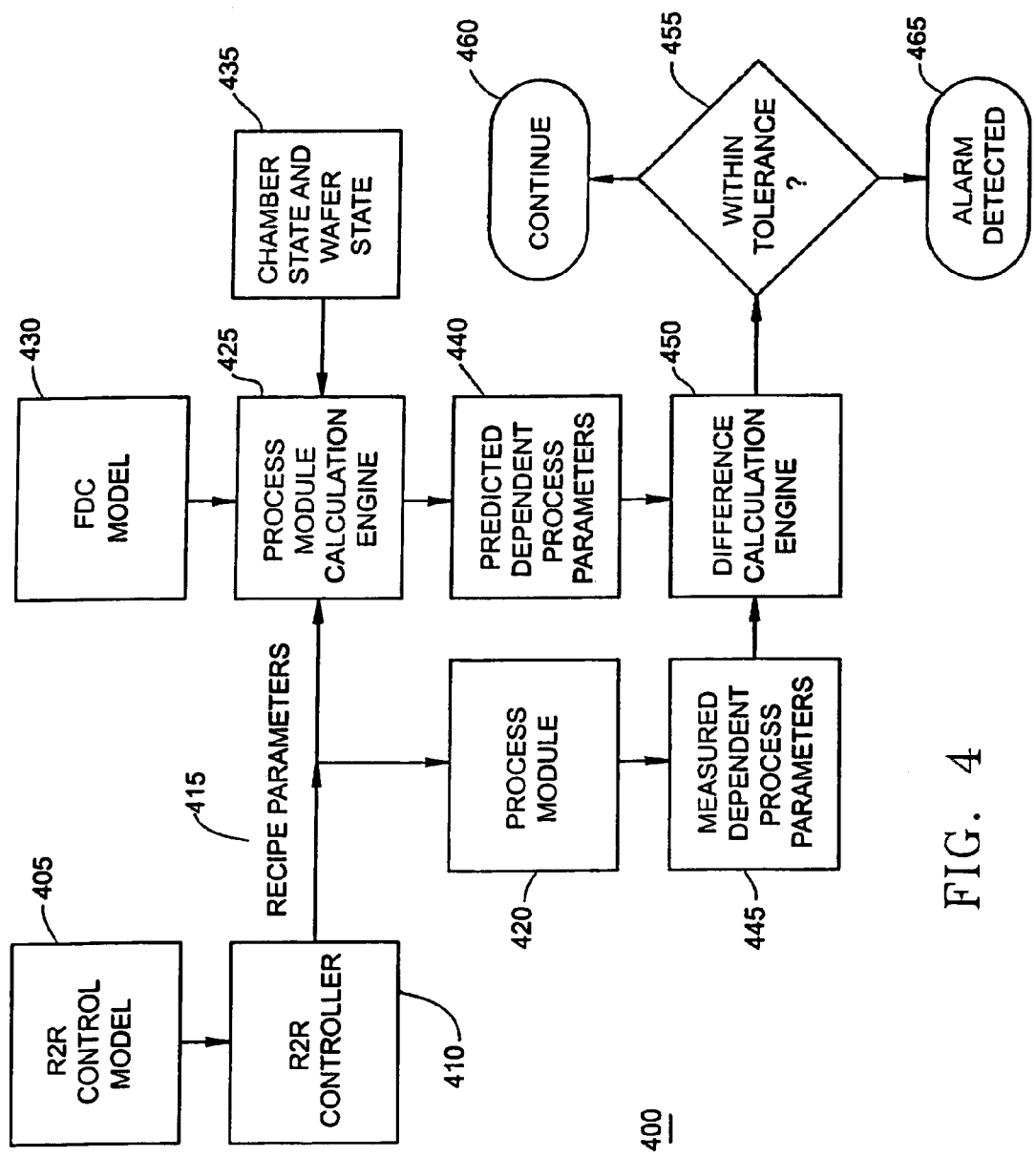
FIG. 4 illustrates a simplified flow diagram for an FDC system and an R2R controller in accordance with an embodiment of the invention.

FIG. 4 illustrates a simplified flow diagram for an FDC system and an R2R controller in accordance with an embodiment of the invention. In the illustrated embodiment, an FDC process 400 is shown in the presence of an R2R controller.

Referring to FIG. 4, the R2R Controller 410 uses an R2R Control Model 405 to adjust the Recipe Parameters 415, which are sent to the Process Module 420 as well as to the Process Model Calculation Engine 425. The Process Model Calculation Engine 425 uses an FDC model 430 and the Chamber and Wafer States 435 to calculate a vector of Predicted Dependent Process Parameters 440. The Recipe Parameters 415 are used by the Process Module 420, which during the processing of the wafer produces a vector of Measured Dependent Process Parameters 445. The Measured Dependent Process Parameters 445 are compared to the Predicted Process Parameters 440 by the Difference Calculation Engine 450, which produces a single scalar parameter indicating whether or not the processing was normal (similar to previous known good process runs) or abnormal (not similar to previous known good process runs). For example, the value could be zero if the process run were identical to a known good process run; the value could be one if the process is marginal and greater than one if the process is in the fault condition. In 455, a query is performed to determine if the difference is within a specified tolerance value. When the difference is within a specified tolerance value, the process branches to 460 and the next wafer is processed. When the difference is not within a specified tolerance value, the process branches to 465 and an Alarm Detected process 465 is performed.

In the Alarm Detected process 465, the FDC system examines the alarm and determines when a fault condition has occurred. A number of different alarm/fault conditions can occur when a semiconductor processing system is operating. The FDC system can examine the set of alarm/fault conditions active at a particular time and perform a fault classification.

The FDC system can classify the alarm/fault conditions into a number of different levels. The FDC system can identify which alarm/fault conditions are critical, and which alarm/fault conditions are informational. The alarm/fault condition creator may assign a severity level to each alarm/fault condition and can report it to the FDC system. For example, severity levels can range from level 1—critical to level 10—informational, and the FDC system can change a previously assigned severity level.

The FDC system can use a single alarm/fault condition or several alarm/fault conditions to identify a particular fault. For example, some fault classification may be established by using several results from SPC charts. A fault classification causal spreadsheet can include a table/matrix that consists of columns from the charts and a forecasted cause column. In addition, faults can be classified by a position on a score plot, or by a pattern on a contribution plot.

When an alarm/fault condition is received from a processing module, the FDC system may allow the processing module to execute one or more process re-tries. A process re-try can usually be executed in early steps in a process sequence. For example, during a stability step, or an initialization step, the process can resume from the start of the process step in which the re-try has executed. In addition, the data after the re-try is concatenated to the data before it, and this allows the alarm condition to be examined later. Furthermore, an alarm may be issued during a process re-try.

When alarm/fault condition is received from a processing module, the FDC system can use one or more tables and/or matrices to determine what is the most likely cause of the alarm and/or fault. The tables can include causes and/or solutions for the alarm and/or fault conditions. Once an alarm and/or fault condition has occurred, one or more of the users is able to acknowledge the alarm/fault, meaning that a user is aware of the alarm/fault condition.

When a fault condition is declared, the FDC system can perform a notification and/or intervention. Notification can be via e-mail, pager, cell phone, or other wireless device. Notifications can be configured by person, by day, and by time of day. For example, one or more GUI screens (not shown) can be provided for the tool operator, the process engineer on a workstation, and a host monitor. The GUI display can show the position for the wafer during the paused process, and can show the current process positions for other wafers in other processing modules that are not paused.

One or more of the fault messages that are sent by the FDC system can contain a fault system identifier. For example, a field engineer can contain a fault system identifier to determine what the most likely cause of the error is. The database shall have a field for the fault system identifier. The alarm log can be sorted using the fault system identifier, the date/time, the alarm level, the recipient, the tool, the process module, and/or the alarm message.

In addition, the FDC system can perform an intervention that can include at least one of: pausing the processing tool at the end of the current lot, pausing the processing tool at the end of the current wafer, pausing the processing module at the end of the current lot, pausing the processing module at the end of the current wafer, rerouting the wafer/lot to a different tool, or rerouting the wafer/lot to a different module.

The relationship between the process results and the process recipe parameters used by the R2R controller 410 to control the process is given by the R2R Control Model 405. The steps required to produce an R2R Control Model 405 comprise the selection of an appropriate process model (e.g. linear, quadratic, fill quadratic), selection of the process parameter(s) to use to control the process, the selection of an appropriate design of experiment (DOE), the execution of the experiment, the analysis of the data to produce the model and installation of the model in the R2R controller.

In an integrated APC/FDC system, such as the Ingenio system, the data acquisition required to build the FDC model 430 can be performed at the same time as the DOE is executed to collect the data necessary to build the R2R Control Model 405. For example, an automated DOE process can be performed. The data required to build the FDC model 430, called the training set, includes the process recipe parameters as well as the resultant dependent parameters. Since the DOE normally spans the allowable range of control for the R2R controller 410, the resultant training set will also span the range of data expected from subsequent process runs, including those runs where the R2R controller 410 is operating.

Once the training set has been analyzed using the techniques of PLS and the FDC model is obtained, the model is then transferred to the FDC sub-system of the integrated APC system. The FDC model can be activated to run when the R2R controller is operating based on the context of the incoming material.

One aspect of the invention provides a method for implementing Fault Detection and Classification (FDC) in a system of Advanced Process Control (APC) comprising: creating an FDC model; providing the FDC model to a process model calculation engine; computing a vector of predicted dependent process parameters using the process model calculation engine; establishing a process recipe comprising a set of recipe parameters, providing the process recipe to a process module; executing the process recipe to produce a vector of measured dependent process parameters; calculating a difference between the vector of predicted dependent process parameters and the vector of measured dependent process parameters; comparing the difference to a threshold value; and declaring a fault condition when the difference is greater than the threshold value.

In one embodiment, SPC techniques can be used to declare a fault condition. In addition, the FDC model engine can use the independent process parameters, the process chamber state, or the incoming wafer state, or a combination thereof for the calculation of the dependent process parameters.

When an R2R control model that is used to relate the process parameter inputs to the desired process result is created, an automated DOE process can be used, and the FDC model that is used to relate the dependent process parameters to the independent process parameters can be simultaneously created.

The R2R controller 410 can comprise a feed forward portion and/or a feedback portion that is used to adjust the controller to maintain the desired post-process result. An integrated metrology module (IMM) can be used to determine the wafer state before processing (the pre-process state) the wafer, and the IMM can be used to determine the wafer state after processing (the post-process state) the wafer.

When the R2R controller comprises a feedback portion, EWMA filter techniques can be used to calculate the feedback offset. When the R2R controller comprises a feedback portion, lot averages can be used to calculate the average error.

Chamber state information can be obtained from an OES sensor, a voltage/current (V/I) probe, a temperature sensor, a pressure sensor, a flow sensor, or a RF sensor, an RF sensor, a plasma density sensor, an radical density sensor, an electron energy sensor, an ion energy sensor, an RGA (Residual Gas Analyzer) or a combination thereof. For example, the process model calculation engine 425 can include the dependent parameters resulting from measurements using an OES sensor, a voltage/current (V/I) probe, a temperature sensor, a pressure sensor, a flow sensor, or a RF sensor, an RF sensor, a plasma density sensor, an radical density sensor, an electron energy sensor, an ion energy sensor, an RGA (Residual Gas Analyzer) or a combination thereof.

The R2R control model 405 can use PLS analysis techniques, or PCA analysis techniques, or a Mahalanobis-Taguchi system, or a combination thereof. In addition, the FDC model 430 can use PLS analysis techniques, or PCA analysis techniques, or a combination thereof.

Figure 5:
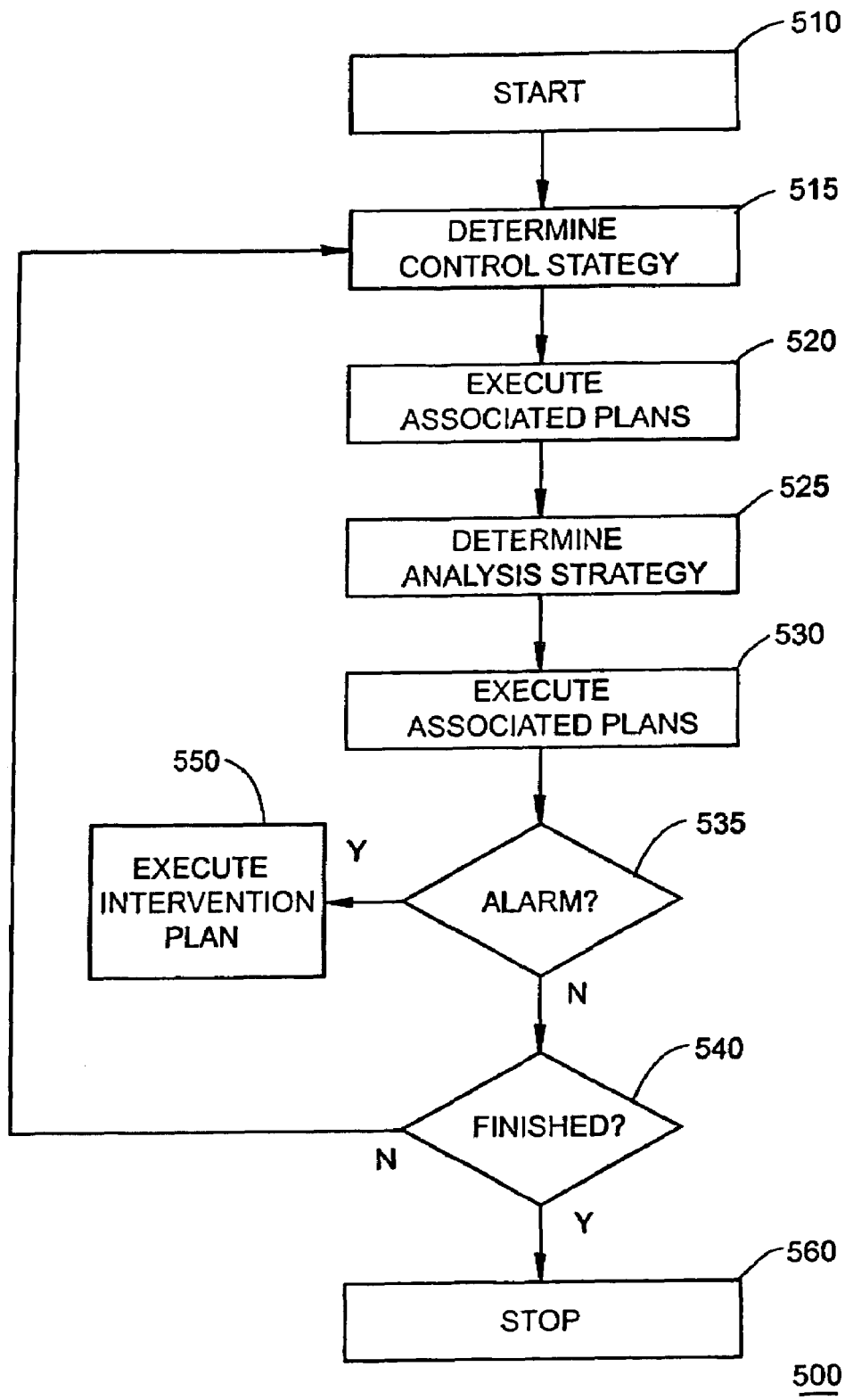
FIG. 5 shows a simplified view of a flow diagram for performing a fault detection and classification (FDC) process for processing tools in a semiconductor processing system in accordance with embodiments of the invention.

FIG. 5 shows a simplified view of a flow diagram for performing a fault detection and classification (FDC) process for processing tools in a semiconductor processing system in accordance with embodiments of the invention. The FDC software and associated GUI screens provide a simple, user-friendly procedure for monitoring one or more processing tools in the system. Procedure 500 can be performed for each production step being performed by a processing tool in the semiconductor processing system. Alternately, procedure 500 can be performed for a set of production steps performed by a processing module in the semiconductor processing system. A production step can be an etching process, a deposition process, a diffusion process, a cleaning process, a measurement process, a transfer process, or other semiconductor manufacturing process.

In 510, a Start Event can be received. For example, a processing tool/module controller can send a Start Event to the APC system. Alternately, another computer, such as a host controller, may send the Start Event. A Start Event can be a point in time when a process or recipe step starts and can be context-based. For example, Wafer In, Recipe Start, Process Start, Step Start, Module Start, and Tool Start can be Start Events. In addition, a Start Event can occur when a wafer enters a processing chamber. Alternately, a Start Event can occur when a wafer enters a transfer chamber or when a wafer enters a processing system.

In 515, a control strategy is determined based on a process context. The process context can be dependent upon the production step being performed and/or the chamber being monitored. The context determines which strategy and/or plan is executed for a particular process recipe. For example, if a recipe contains a context term FDC, then control strategies associated with the FDC context term can be executed when process tool runs processes with any recipe that contains the context term (element) FDC.

During runtime, a Start Event can cause the APC system to lookup the current context data, determine which strategies match the context, determine which plans to run, and invoke their corresponding scripts. A control strategy record can contain context-matching information such as wafer-run, tool, chamber, recipe, slot, etc. For example, the APC System can compare the runtime context information and try to match it against a database of strategies. Each control strategy can contain at least some of the following context information: Tool id, Lot id, Chamber id, Cassette id, Slot id, Wafer id, Recipe id, Start time, End time, Step number, State, Maintenance counter value, Product id and material id. The process context can be dependent upon the process being performed and the tool being monitored. In a context matching process, search order can be important. For example, the search can be executed by using the precedence order in GUI table. Search can be implemented using SQL statements. Once a control strategy is identified, a control plan, a data collection plan, and/or an FDC plan can be automatically determined. The plan IDs can be sent to "execute control strategy" modules. If a matching strategy does not exist when the compare process context function is performed, then the software displays an error/alarm message in the fault field in tool status GUI screen and popup windows can be used to allow a user to correct the error.

Context can be defined by a combination of the context elements. For example, context can be an array of the context elements in a pre-determined order, or context may be a set of name-value pairs in a dictionary form.

In 520, the plans associated with the control strategy are executed. At least one of a control plan, a data collection plan, a data pre-processing plan, and an FDC plan can be executed. In addition, a judgment plan, an intervention plan, a sensor plan, a parameter select plan, and a trim plan can also be executed.

Data collected during production runs that yield high quality product can be used to establish "good tool state" data, and data collected subsequently can be compared with this baseline data to determine if a tool is performing correctly in real-time.

A control strategy can be established to determine tool health status as part of the Quality Control (QC) testing. A control strategy and its associated plans can be executed to ensure that a system or a portion of the system such as a processing tool is operating properly. For example, a tool health control strategy and its associated plans can be executed at a prescribed time or when a user schedules one. When a tool health control strategy and its associated plans are being executed, diagnostic wafer data can be collected. A diagnostic, dummy, product, or test wafer can be processed, and the context can be tool, module, or sensor diagnostics.

Control strategies and their associated FDC plans can be established and executed for process module characterization processes, such as seasoning-related processes, and chamber fingerprinting processes. For example, after a cleaning or a maintenance process (i.e., wet clean) a number of dummy wafers can be processed using chamber characterization-related strategies, plans, and recipes. A user can use the strategies and plans that are part of the system, or a user can easily and quickly develop new chamber characterization-related control strategies using the APC system and FDC plans using the FDC system. The data from these chamber characterization runs can be used to further refine the process, tool, and/or FDC models. The data can be used for analysis to identify the best control strategies, R2R models and FDC models.

Static and dynamic sensors are setup when a data collection plan is executed. The data collection plan can comprise a sensor setup plan. For example, the start and stop times for the sensors can be determined by the sensor setup plan. The dynamic variables required by the dynamic sensors can be determined by the sensor setup plan. A recipe start event can be used to tell a sensor to start recording. A wafer in event can be used to setup a sensor. A recipe stop event or a wafer out event can be used to tell a sensor to stop recording.

The data collected and the sensors being used are dependent upon the control strategy context. Desirably, different sensors can be used and different data can be collected for product wafers and non-product wafers. For example, tool status data can be a small portion of the data collected for a product wafer, and tool status data can be a large portion of the data collected for a non-product wafer.

The Data Collection Plan also includes a Data Preprocessing Plan that establishes how the expected observation parameters are to be processed with respect to spike counting, step trimming, value thresholds, and value clip limits.

When the data-preprocessing plan is executed, time series data can be created from raw data files and saved in the database; wafer summary data can be created from the time series data; and lot summary data can be created from the wafer data. The data collection can be executed while the wafer is being processed. When the wafer is out of this process step, then the data pre-processing plan can be executed.

A data collection plan is a reusable entity configured by the user to collect the desired data. The data collection plan consists of the configuration of one or more sensors on one or more separate process modules. The plan also includes the selection of the data items that should be collected by the associated sensors, and which of the data items are to be saved.

A sensor can be a device, instrument, processing tool, process modules, sensor, probe, or other entity that either collects observation data or requires software setup interaction, or can be handled by the system software as if it is a sensor. For example, processing tools and process modules can be treated as if they are sensors in data collection plans.

Several instances of the same sensor type can be installed on a tool at the same time. The user can select the specific sensor or sensors to use for each data collection plan.

Data collected in the system flows through a set of steps between the real-time sensor collection and the database storage. Data collected can be sent to a storage device that can comprise a real-time memory SQL database. The storage device can provide a physical location for the data to be processed by different algorithms defined by the user through plans in the APC system and by scripts defined by the user.

The APC system provides independent data collection modes and setup modes for each process module; that is, each process module can be independent of any other process modules, and the setup of one process module does not interrupt the data collection of other process modules. This minimizes the amount of non-productive time for the semiconductor processing system.

When a control strategy comprises an FDC plan, the FDC plan can be executed after a start event, such as a wafer-in event, a process start event, or a recipe start event occurs. The plan execution can be rule based and comprise SQL statements. When an error and/or alarm is detected by an FDC plan associated with a control strategy, an error and/or alarm message can be sent to an intervention manager, the intervention manager can process the error and/or alarm message, and the intervention manager can send notification and/or intervention messages.

In 525, the analysis strategy can be determined based on a process context. The process context can be dependent upon the production step being performed and the tool being monitored. The context determines which analysis strategy and/or plan is executed for a particular process step. For example, to associate an analysis strategy with a process type such as "Tool Health", the context for the analysis strategy should contain the context term "Tool Health".

An analysis strategy can be a holder of plans. An analysis strategy and the associated plans "analyze" the data after collection.

In one embodiment, a process context can be compared with a list of analysis strategies. For example, an APC server gets the current process context as a string when a "process start" event occurs. The process context can be compared with the list of analysis strategies, and then the proper strategies are identified.

In this process, search order can be important. For example, the search can be executed by using the precedence order in GUI table. Search can be implemented using SQL statements. When an analysis strategy is identified, at least one of an SPC plan, a PLS plan, a PCA plan, an MVA plan, an FDC plan, an intervention plan, and a user defined plan can be automatically determined. The plan IDs can be sent to "execute analysis strategy" modules. If a matching strategy does not exist when the compare process context function is performed, then the software can display an error message in the fault field in tool status GUI screen and popup windows can be provided to a user to identify the correct strategy to use.

There can be multiple analysis strategies that match a run context, and these analysis strategies can be executed at a particular time for a particular processing tool. The user can change the order of the strategies within a specific context by moving the strategies up or down on the list. When the time comes for the strategy to be selected, the software can start at the top of the list and goes down the list until it finds the first strategy that matches the requirements determined by the context and executes that strategy first.

In addition, there can be multiple plans in each analysis strategy, and the user determines the order of the plans within an analysis strategy by moving the plans up or down on the list. When the time comes for the plans to be executed, the software starts at the top of the list and goes down the list.

One method for using context-based execution can be to perform context matching. For example, when executing context matching, the context of the wafer currently being processed can be used. Alternately, the context of a substrate or other semiconductor product currently being processed can be used. When the context is determined, it can be compared with the context of analysis strategies. When a context match occurs, one or more analysis strategies can be executed.

When an analysis strategy is executed, analysis plans, invention plans, and/or FDC plans can be identified. For example, a context-matching execution software module can be used that allows for the dynamic setup and invocation of at least one analysis strategy. In one case, a wafer-out event can trigger a system controller to lookup the current context data, determine which analysis strategies to run, and invoke the corresponding scripts to determine the associated plans.

In 530, the plans associated with the analysis strategy are executed. In one embodiment, the plans associated with the analysis strategy are executed after an end event. In an alternate embodiment, an end event is not required. An end event can be a point in time when a process or recipe step stops and can be context-based. For example, wafer out, recipe stop, process stop, step stop, module stop, and tool stop can be stop events. In addition, a stop event can occur when a wafer exits a processing chamber. Alternately, a stop event can occur when a wafer exits a transfer chamber or when a wafer exits a processing system.

When the analysis plans are executed, at least one of an SPC plan, a PLS plan, a PCA plan, an MVA plan, an FDC plan, an intervention plan, and a user defined plan can be executed. Analysis performed on data collected during production runs that yield high quality product can be used to establish a "good tool state" model, and data collected subsequently can be analyzed using this baseline model to determine if a tool is performing correctly in real-time.

An analysis strategy can be established to determine tool health status as part of the Quality Control (QC) testing. For example, a tool health analysis strategy and its associated plans can be executed to ensure that a system or a portion of the system such as a processing tool is operating properly. A tool health analysis strategy and its associated plans can be executed at a prescribed time or when a user schedules one. When a tool health analysis strategy and its associated plans are being executed, diagnostic wafer data can be analyzed using diagnostic models, where the diagnostic models can include SPC charts, PLS models, PCA models, FDC models, and MVA models.

Analysis strategies and their associated FDC plans can be established and executed for process module characterization processes, such as seasoning-related processes, and chamber fingerprinting processes. For example, after a cleaning or a maintenance process (i.e., wet clean) a number of dummy wafers can be processed using chamber characterization-related strategies, plans, and recipes. A user can use the strategies and plans that are part of the system, or a user can easily and quickly develop new chamber characterization-related control strategies using the APC system and FDC plans using the FDC system. The data from these chamber characterization runs can be used to further refine the process, tool, and/or FDC models. The data can be used for analysis to identify the best control strategies, R2R models and FDC models.

When an analysis strategy comprises an FDC plan, the FDC plan can be executed after an end-event, such as a wafer-out event, a process stop event, a recipe stop event, a batch-out event, or a lot-out event. The execution can be rule based and comprise SQL statements. In an alternate embodiment, an FDC plan may operate independent from an end-event. When an error and/or alarm is detected by an FDC plan that is associated with an analysis strategy, the FDC plan can send the error and/or alarm message to an intervention manager, the intervention manager can process the error and/or alarm message, and the intervention manager can send notification and/or intervention messages.

The control strategy FDC plans and the analysis strategy FDC plan can operate independently. Each FDC plan does not need to know the actions in other FDC plans. As a result, there can be some redundancy or inconsistency in actions, and an intervention manager can be used to resolve any problems.

In 535, a query can be performed to determine if an error has been detected. When an error has been detected, procedure 500 branches to 550. When an error has not been detected, procedure 500 branches to 540.

In 550, an intervention plan can be executed. The intervention plan executes the following processes: get messages (alarms) from each FDC plan; categorize actions from different FDC plans; attach process condition like tool Id, recipe Id, recipe start time, etc. for email and log; save log file/database; and send the proper message to intervention manager.

Intervention plans can include a number of different actions that can be taken as the result of data analysis. For example, these actions can include: flag a suspect wafer or lot and notify a system owner and/or tool owner; page or e-mail an engineer to review the data and make a decision; inhibit the tool from processing wafers until the data has been reviewed and the inhibit released; stop the tool or take the tool "off-line" which can purge the remaining wafers from the tool; and trigger chamber cleaning or maintenance procedures.

Desirably, only one intervention plan executes during each process step. Intervention plan execution can be implemented in the FDC controller. For example, an intervention plan can get information (messages) from other plans. This information can include a plan ID, messages with suggested actions, fault messages, recovery messages, and action lists.

When the intervention plan is executed, messages on proper actions can be sent by the intervention manager. For example, action candidates can include: display a fault message on a status screen; send message to pause the process before the next wafer; send message to pause the process before the next lot; send pause or stop message to one or more tools, send pause or stop message to one or more process modules, send pause or stop message to one or more sensors, send email to a system owner, tool owner, or process owner. For example, a "stop" message can be used to tell the tool to continue processing the wafers already in the tool, and an "abort" message can be used to tell the tool not to process the wafers in the tool and to send them back to the carrier.

In some cases, the FDC and/or APC system can intervene and respond to a problem without human intervention. In other cases, human intervention is required. For example, a user can access the data from the system to determine the nature of the fault, and the user can decide to continue with the process or terminate it. If the user terminates the process, then a tool can be put into repair state. The user can trigger this from the tool screen. For example, a user can decide to do a chamber wet clean. After wet clean, check, and process test, the process can resume with the next wafer when a fault has not been detected. The FDC and/or APC system can present "tool health" charts to the user. For example, the charts can include manometer data, mass flow data, leakage data, pump data, gas system data, cassette system data, and transfer system data. The charts can display real-time data, historical data, and the combination of real-time and historical data for one or more tools, one or more modules, one or more wafers, one or more process steps, and for different times.

In 540, a query can be performed to determine if the process has finished. When the process has finished, procedure 500 branches to 560, and procedure 500 ends. When the process has not finished, procedure 500 branches to 515, and procedure 500 continues as shown in FIG. 5.

The APC system can be used to detect and classify tool errors when a tool is not in production; detect and classify tool errors during production; detect and correct tool errors during production; predict tool errors before production; and predict tool errors after production. For example, the tool status monitoring system can interface with processing tools which perform a number of self-monitoring functions such as Auto setup functions, Auto check functions, and Self-check functions. When the tool sends the machine events in real-time, the monitoring system monitors the data in real-time, and when the tool sends the data in non-real-time, the monitoring system processes the data as soon as the tool sends the data (i.e. data stored in the Machine logs). Tool data can include information such as leak-rate check, zero offset, history events, alarm information, and process log data.

The system can comprise strategies, plans, and baseline models that can be used in FDC applications, Chamber Fingerprinting applications, Seasoning Completion applications, Consumable Life predictions, Wet clean cycle applications, and the diagnostic applications for parts assembly. In addition, the APC system can collect and analyze the ARAMS (Automated Reliability, Availability and Maintainability Standards) logs from a processing tool. The APC system can perform this data collection as a part of a data collection plan.

The system can comprise strategies and plans for collecting and analyzing maintenance data. The data collection plans include consumable parts and maintainable parts. For example, these parts can include Focus rings, Shield rings, Upper electrodes, etc. Maintenance data strategies and plans are dependent on tool type, process module type and number, etc. Default maintenance data strategies and plans can be configured automatically as part of the tool setup, process module setup, and add-on sensor setup information. A user can change the default settings. The maintenance data can be used to provide wafer-to-wafer FDC, batch-to-batch FDC, or lot-to-lot FDC.

Figure 6:
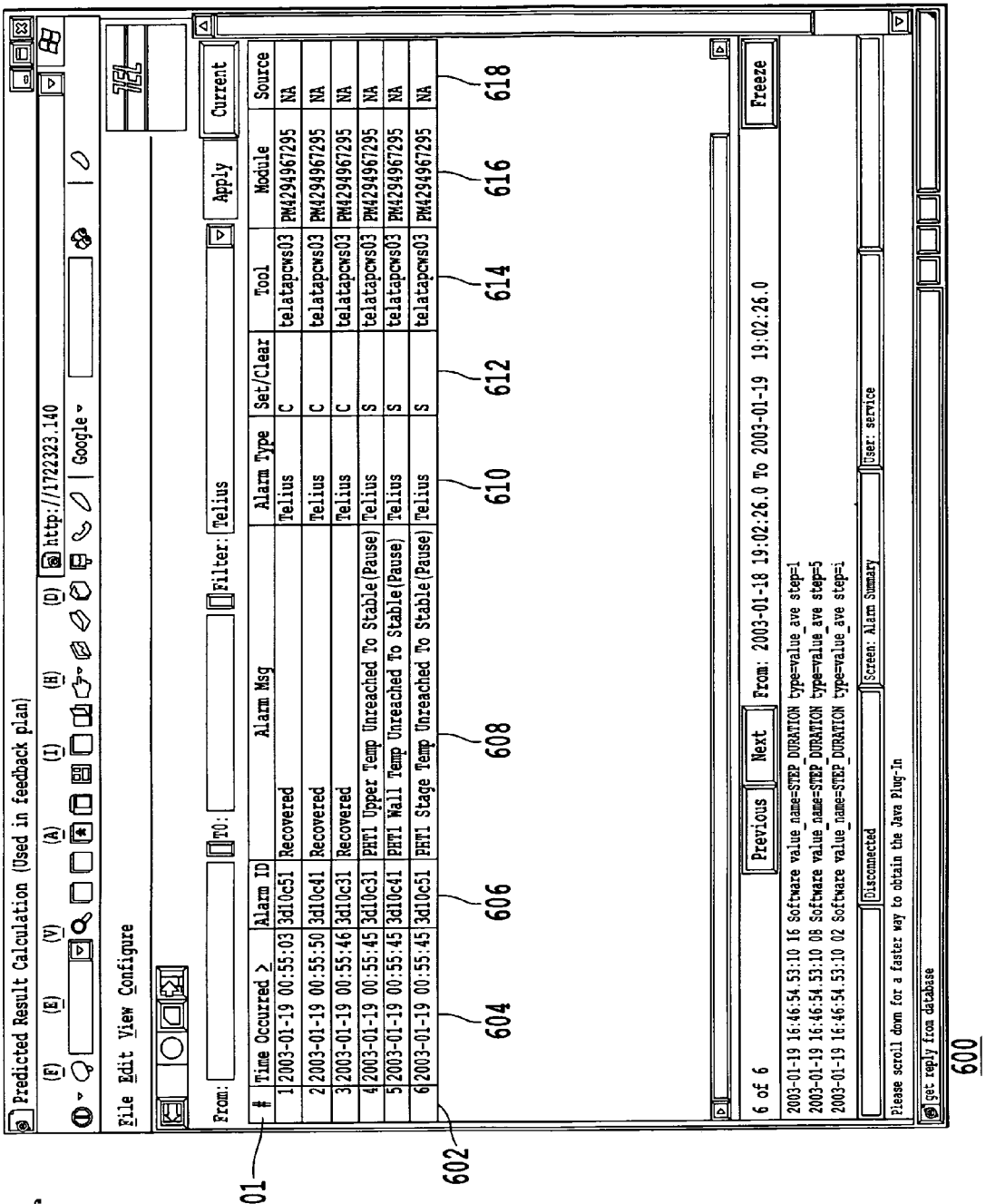
FIG. 6 shows an exemplary view of a Alarm Summary screen in accordance with an embodiment of the invention.

The system can store information for different types of alarms, and messages can be displayed on one or more GUI screens, such as an Alarm Summary screen 600, as shown in FIG. 6. In one embodiment, an alarm summary screen includes a table 601 with entries for an alarm number 602, an alarm time 604, alarm identification information 606, a description of the alarm 608, an alarm type 610, an indication of whether the alarm has been set or cleared 612, an indication of the tool which raised the alarm 614, an indication of the module which raised the alarm 616, and a source of the alarm 618. Alarm groups can include alarms that occurred at the tool, alarms that occurred in the software, and alarms that occurred due to a run rule violation. The software application may generate software alarms in a number of different circumstances. For example, alarms having varying levels of severity can be generated when starting up; when shutting down; when connecting to a tool and/or module; when disconnecting from or losing connection with a tool and/or module; when performing an unsuccessful control action; and when encountering any error. The software alarms can be differentiated by the assignment of error codes.

In one embodiment, the processing system and the host system co-operate to determine the correct response to an alarm and/or fault, and the proper sequence to use to process a wafer.

The R2R controller and the FDC system cooperate in multi-pass processing. For example, when one pass through a processing module does not provide the desired process result and one or more additional passes may be required during wafer processing. In this case errors are not be generated by the R2R controller or the FDC system. In addition, the R2R controller and the FDC system cooperate during wafer processing when isolated and nested structures are present on the wafer.

FIG. 7 illustrates an exemplary view of an FDC Control Strategy Screen 700 in accordance with an exemplary embodiment of the invention. An FDC Control Strategy Screen can comprise a number of configuration items. The Strategy Name field 702 can be used enter/edit an FDC Control Strategy name. A Description field 704 can be used to enter/edit an FDC Control Strategy Description. The mode field 714 can be used to enter/edit a mode for the FDC Control Strategy. For example, modes can include a standard mode and a simulation mode. An enabled box can be used enable or disable an FDC Control Strategy A Load Port field 706 can be used to obtain a list of load port information from the processing tool. A Load Port Update Button 712 can be used as a refresh function, and can be used to obtain the current load port information from the processing tool.

A System Recipe field 716 can be used to obtain a list of system recipes from the processing tool. A System Recipe Update button 718 can be used as a refresh function, and can be used to obtain the current recipe information from the processing tool. For example, the system recipe name can be used to trigger the FDC control strategy by matching one or more context items such as the system recipe name.

A Transfer Route field 708 can be used to obtain the transfer route for selected load port and system recipe from the processing tool. A Transfer Route Update button 719 can be used as a refresh function, and can be used to obtain the current recipe information from the processing tool.

The Metrology Data Failure field 710 can be used to enter/edit the metrology data failure action from the following options: Use Tool Process Recipe (Nominal Recipe)—the software sends the indication to the process tool and the process tool uses the tool process recipe. Do Not Use Process Recipe (Null Recipe)—The software sends the null recipe information associated with the wafer to the process tool and the wafer goes in and out of the chamber without being processed. For example, a PM Pause command can be used to pause the process module, and a System Pause command can be used to pause the system including transfer system.

The Control Failure field 720 can be used to enter/edit the Control Failure option from the following options: Use Tool Process Recipe (Nominal Recipe)—the software sends the indication to the process tool and the process tool uses the tool process recipe. Do Not Use Process Recipe (Null Recipe)— The software sends the null recipe information associated with the wafer to the process tool and the wafer goes in and out of the chamber without being processed. PM Pause— Pauses the process module, and System Pause—Pauses the system including transfer system.

In addition, a number of Usage Context Specification fields 721 can be used to provide additional context matching items when these additional context items are required. A LotID(s) field can be used to enter/edit the lot identifiers; a Wafer ID(s) field can be used to enter/edit the wafer identifiers; a CJID(s) field can be used to enter/edit the control job identifiers; a PJID(s) field can be used to enter/edit the process job identifiers; a Cassette ID(s) field can be used to enter/edit the cassette identifiers; a Carrier ID(s) field can be used to enter/edit the carrier identifiers; a Slot(s) field can be used to enter/edit the slot numbers; a Substrate ID(s) field can be used to enter/edit the substrate identifiers; a Wafer Type(s) field can be used to enter/edit the wafer types; a Scribed Wafer ID(s) field can be used to enter/edit the scribed wafer identifiers; one Start Time field can be used to enter/edit the start time; and a second Start Time field can be used to enter/edit the end time.

As shown in FIG. 7, an FDC Control Strategy can include in one embodiment of the present invention one or more FDC control plans. In addition, the Control (feed forward) Plans tab 722 and the Feedback Plans tab 724 can be used to create a new FDC control plan, associate an FDC control plan with an FDC Control Strategy, and edit an FDC control plan.

Thus, using an FDC Control Strategy Screen, a user can perform an FDC Control Strategy configuration, view an existing FDC Control Strategy, create a new FDC Control Strategy, copy an existing FDC Control Strategy, edit an existing FDC Control Strategy, delete an existing FDC Control Strategy, and test an FDC Control Strategy. For example, a dropdown list can be used to select a course of action.

FIG. 8 illustrates an exemplary view of an FDC Control Plan Editor Screen 800 in accordance with an exemplary embodiment of the invention. To create an FDC Control Plan, a user can select the plan name item and select a new Control Plan or an existing plan or model. For example, on an FDC Control Strategy screen, a drop-down menu can appear and the Add Plan selection can be chosen.

An FDC Control Plan screen can comprise a number of fields. The Plan Name field 802 can be used to enter/edit a name for an FDC control plan. A Module field 806 can be used to enter/edit a module name. For example, if the plan is associated with a strategy, the module field may be automatically filled in. If the plan is unassociated, the module field can be used to select a process module or a measurement module. The Recipe field 808 can be used to enter/edit a recipe. For example, if the plan is associated with a strategy, the recipe field may be automatically filled in. If the plan is unassociated, the field can be used to select a process recipe for a process module or a measurement recipe for a measurement module.

The Description field 804 can be used to enter/edit a description for the plan. The Updated field 810 displays the last time the plan was changed.

The Data Sources table 812 can be used to enter/edit a data source. For example, an FDC Plan Data Source screen may be opened. The Data source table can include a source type, a data source description, and a data source parameter/value. For example, the selected source type determines the options displayed on the Data Source screen; a "Telius ODP" type can be used to define integrated metrology module data sources that are part of the processing tool; a "Desired Output" type allows the user to enter a fixed unit for the controller; a "Feedback Offset" type allows the user to define a persistent feedback variable; a "Control Plan Value" allows the user to create a variable that references the results of a different control plan (creates nested plans); the "Integrated Metrology Site Filtering" type creates tables with descriptions of each option when each data source is selected; and a "ContextItem" type allows a user to create a variable that references a context item, such as a Slot_Id, a Wafer_id, or a wafer number.

The symbol can be selected from the Symbol drop-down list, and a source type can be selected from the Data Source Type drop-down menu. For example, the data source information fields can vary depending on the chosen data source.

Two input data sources (d1, d2) are shown, but this is not required. A different number of input data sources can be used, and each input data source can have a different symbol value. A data source can be a control plan value such as a desired process result or a calibrated date item. In addition, a data source can be an ODP tool, and it can be part of the processing tool, such as a Telius. Furthermore, another data source can be a SEM, and the Parameter/Value can be actual measured data such as CD-SEM data.

In general, process control can include updating a process module recipe using metrology information measured on the wafer prior to its arrival in the process module. The controller can use the pre-processing data to determine how many visits are required to the various physical modules. The desired process result can be a "y" value in a model equation. The task is to determine when the desired process result "y" is the correct value.

In the target calculation field 814, on an FDC Control Plan screen, the target calculation can be entered. For example, the target calculation can be set equal to the data source item. Alternately, an equation may be entered that correlates one set of data with another set of data. In addition, target calculation may comprise an additional compensation term. For example, the additional compensation factor can be used to correct for errors introduced in another step, such as a photo resist step. A new target value can be a variable that is calculated at or before run time, and an equation can be used to calculate the target value.

In addition, new lower and upper limit values can be used, and these values can be entered in the lower limit field and upper limit field. For example, the new lower and upper limit values can be constants or variables that are calculated at or before run time, and equations can be used to calculate the new lower and upper limit values.

The Model Selections field 816 can be used to edit/enter a static model and/or a formula model. For example, under the model type selection item, a selection item in the table can be used to enter and/or edit a model type. A drop down list can be activated from the table item and a selection can be made from the drop down list. One option in the drop down list allows a new model to be created; other options can be used to display and select existing models to use or to modify. Each model type can have a module name, target value, lower limit, upper limit, and recipe output associated with it. When creating a new model, a new model type can be used and entered in the model type field, and a new model name can be used and entered in the model name field.

The Predicted Result Calculation field 820 can be used to enter a new predicted result value or select an existing predicted result value. The predicted result value can be an equation for the expected result. For example, a Control Plan can be saved when Name, Target Calculation, and Model Selection information is entered.

The # field 818 comprises a number of the model in the list of models. The model type allows either a Static or a Formula model to be selected. The Model Name field lists the names of available models. For example, to create a new model, a "New Static Recipe" option or a "New Formula Recipe" option can be selected from a drop down list. A static control plan can be created that comprises one or more static recipes. For example, ten or more static models can be shown. The static models are shown with the same target value (t1), but this is not required. A different number of static and/or formula models can be used, and each model can have a different target value. A new target value can be calculated when each static recipe is used. The static recipe models can have different operating ranges as defined by the lower limit values and the upper limit values. In addition, the static recipe models can have different static recipe outputs, and a different static recipe output can be determined for each static recipe.

The FDC control plan can include a static model recipe, or a formula model recipe, or a combination thereof. The controller can auto-generate control plans for modules. A process recipe can comprise one or more processes each comprising one or more processing steps. The process recipe can be performed in a single chamber or multiple chambers. The process recipe can be configured using at least one of a nominal recipe, a static recipe, and a formula model.

A static recipe can be a single set of recipe adjustments that are used to achieve a specific process result. A set of static recipes can be used to set up a table-based controller, or static recipes can be used along with formula models to treat ranges of the desired output where the same recipe should be used. When using feedback with static recipes, a single predicted process result can be specified in the control plan for each static recipe used.

The software and associated GUI screens presented herein are also available in multiple languages. The GUI screen layouts have been designed to assist in global tool installations. Users in many countries will find the context-based data management software easy to use and understand. When a system is installed or the system configuration is changed, the software creates all required databases and files for the user. The context-based data management GUI screens provide a means of interaction between the system and various levels of end users.

The software sets up machine type and hardware configurations at installation and afterwards as configurations change. For example, user profiles can be created for language and user preferences for views providing features such as: Touch screen only, Support for keyboard and mouse, multiple languages—Japanese, English, French, German, etc., User class-systems, class level, PE, EE, operator, Color blind—gray scale/patterns or color, Left to right, top to bottom workflow, Icons, pictures, or words, and static tabs.

Although only certain embodiments of this invention have been described in detail above, those skilled in the art will readily appreciate that many modifications are possible in the embodiments without materially departing from the novel teachings and advantages of this invention. Accordingly, all such modifications are intended to be included within the scope of this invention.

What is claimed is:

1. A computer-implemented method for implementing Fault Detection and Classification (FDC) in an. Advanced Process Control (APC) system including a run-to-run (R2R) controller, the method comprising:
   receiving an FDC model from memory, the FDC model based on normal tool level parameters;
   receiving chamber and wafer state data;
   receiving a process recipe comprising a set of recipe parameters from the R2R controller based on an R2R control model, the R2R control model distinct from the FDC model;
   providing the process recipe to a process module;
   providing the FDC model, the chamber and wafer state data, and the process recipe to a process model calculation engine;
   computing a vector of predicted dependent process parameters using the process model calculation engine based on the provided FDC model, the chamber state and wafer state data and the process recipe;
   executing the process recipe using only a first wafer of a plurality of wafers in a lot to produce a first vector of measured dependent process parameters;
   calculating a first difference for the first wafer using the vector of predicted dependent process parameters and the first vector of measured dependent process parameters for the first wafer;
   comparing the first difference for the first wafer to a threshold value;
   declaring an alarm condition when the first difference for the first wafer is greater than the threshold value; and
   displaying alarm condition information on a GUI screen.

2. The computer-implemented method as claimed in claim 1, wherein statistical process control (SPC) techniques are used to declare the alarm condition.

3. The computer-implemented method as claimed in claim 1, wherein the FDC model engine uses a process chamber state, or an incoming wafer state, or a combination thereof as independent process parameters for calculation of the predicted dependent process parameters.

4. The computer-implemented method as claimed in claim 1, further comprising:
   creating an R2R control model that relates process parameter inputs to a desired process result using an automated design of experiments (DOE) methodology; and
   creating the FDC model that relates the predicted dependent process parameters to independent process parameters using an automated DOE methodology.

5. The computer-implemented method as claimed in claim 4, wherein the R2R control model uses Partial Least Squares (PLS) analysis techniques, or Principal Components. Analysis (PCA) analysis techniques, or a combination thereof.

6. The computer-implemented method as claimed in claim 1, wherein the APC system includes an integrated metrology module (IMM) for determining a wafer state before processing the first wafer and a new wafer state after processing the first wafer.

7. The computer-implemented method as claimed in claim 1, wherein the R2R controller comprises a feed forward portion, or a feedback portion, or a combination thereof that is used to adjust the R2R controller to maintain a desired vector of measured dependent process parameters.

8. The computer-implemented method as claimed in claim 7, wherein when the R2R controller comprises a feedback portion, and exponentially-weighted moving average (EWMA) filter techniques are used to calculate a feedback offset.

9. The computer-implemented method as claimed in claim 7, wherein when the R2R controller comprises a feedback portion.

10. The computer-implemented method as claimed in claim 3, wherein the APC system includes a plurality of sensors and the process chamber state can be obtained from at least one of the sensors, wherein the plurality of sensors includes an optical emission spectroscopy (OES) sensor, a voltage/current (V/I) probe, a temperature sensor, a pressure sensor, a flow sensor, or an RF sensor, a plasma density sensor, an radical density sensor, an electron energy sensor, an ion energy sensor, an RGA (Residual Gas Analyzer) or a combination thereof.

11. The computer-implemented method as claimed in claim 3, wherein the APC system includes a plurality of sensors and the dependent parameters resulting from measurements can be obtained from at least one of the sensors, wherein the plurality of sensors includes an optical emission spectroscopy (OES) sensor, a voltage/current (V/I) probe, a temperature sensor, a pressure sensor, a flow sensor, or an RF sensor, a plasma density sensor, an radical density sensor, an electron energy sensor, an ion energy sensor, an RGA (Residual Gas Analyzer) or a combination thereof.

12. The computer-implemented method as claimed in claim 3, wherein the FDC model uses PLS analysis techniques, or PCA analysis techniques, or a Mahalanobis-Taguchi system, or a combination thereof.

13. The computer-implemented method as claimed in claim 1, further comprising:
establishing a severity level for an alarm;
declaring a fault condition when the severity level for the alarm is greater than or equal to a severity limit, wherein a fault level is established for the fault condition; and
waiting for another alarm when the severity level for the alarm is less than the severity limit.

14. The computer-implemented method as claimed in claim 13, further comprising:
sending an intervention message to the process module when the fault condition is declared;
pausing the process module when the intervention message is received and the fault level is less than a fault limit; and
stopping the process module when the intervention message is received and the fault level is greater than or equal to the fault limit.

15. The computer-implemented method as claimed in claim 13, further comprising:
receiving an additional alarm;
establishing a severity level for the additional alarm;
establishing a total severity level using the severity level for the alarm and the severity level for the additional alarm;
declaring an additional fault condition when the total severity level is greater than or equal to the severity limit; and
waiting for another alarm when the total severity level is less than the severity limit.

16. The computer-implemented method as claimed in claim 15, further comprising:
sending an intervention message to the process module when the fault condition is declared;
pausing the process module when the intervention message is received and the fault level is less than a fault limit; and
stopping the process module when the intervention message is received and the fault level is greater than or equal to the fault limit.

17. The computer-implemented method as claimed in claim 1, further comprising:
determining if an alarm is in a feedforward element or a feedback element;
establishing a first severity level when the alarm is in a feedforward element;
establishing a second severity level when the alarm is in a feedback element;
declaring a fault condition when the first severity level, or the second severity level, or the combination is greater than or equal to a severity limit, wherein a fault level is established for the fault condition; and
waiting for another alarm when the first severity level, or the second severity level, or the combination is less than the severity limit.

18. The computer-implemented method as claimed in claim 17, further comprising:
sending an intervention message to the process module when the fault condition is declared;
pausing the process module when the intervention message is received and the fault level is less than a fault limit; and
stopping the process module when the intervention message is received and the fault level is greater than or equal to the fault limit.

19. The computer-implemented method as claimed in claim 17, further comprising:
storing data for the alarm condition.

20. A computer-implemented method of operating a semiconductor processing system comprising:
positioning a first wafer of a plurality of wafers in a lot in a process module;
receiving process context information for the first wafer at a processor;
executing a control strategy on the processor using the process context information;
executing an analysis strategy on the processor using process context information for the first wafer;
calculating a first trim amount for the first wafer using a run-to-run (R2R) control model, wherein a first calculated trim amount comprises a vertical trim value, or a horizontal trim value, or a combination thereof;
computing a first set of process parameters to achieve the first calculated trim amount for the first wafer using an R2R controller;
executing a first process recipe using the first set of process parameters in the process module to process the first wafer;
calculating a predicted trim amount for the first wafer using an FDC model, the first process recipe and chamber and wafer state data;
determining an actual trim amount for the first wafer;
comparing the actual trim amount for only the first wafer to the predicted trim amount for only the first wafer;
creating an FDC alarm when the actual trim amount for the first wafer is substantially greater than the predicted trim amount for the first wafer;
executing an intervention plan on the processor when an a first alarm for the first wafer has been established by at least one executed strategy; and
removing the first wafer from the process module when an alarm condition has not been established by at least one executed plan, wherein the FDC model is distinct from the R2R control model.

21. The computer-implemented method as claimed in claim 20, further comprising: establishing a severity level for the first alarm;
declaring a fault condition when the severity level for the first alarm is greater than or equal to a severity limit, wherein a fault level is established for the fault condition; and
waiting for another alarm from another wafer when the severity level for the first alarm is less than the severity limit.

22. The computer-implemented method as claimed in claim 21, further comprising:
sending an intervention message to the process module when the fault condition is declared;
pausing the process module when the intervention message is received and the fault level is less than a fault limit; and
stopping the process module when the intervention message is received and the fault level is greater than or equal to the fault limit.

23. The computer-implemented method as claimed in claim 21, further comprising:
receiving an additional alarm;
establishing a severity level for the additional alarm;
establishing a total severity level using the severity level for the first alarm and the severity level for the additional alarm;

declaring an additional fault condition when the total severity level is greater than or equal to the severity limit; and waiting for another alarm when the total severity level is less than the severity limit.

24. The computer-implemented method as claimed in claim 23, further comprising:

sending an intervention message to the process module when a fault condition is declared;

pausing the process module when the intervention message is received and the fault level is less than a fault limit; and stopping the process module when the intervention message is received and the fault level is greater than or equal to the fault limit.

25. The computer-implemented method as claimed in claim 20, further comprising:

establishing a first severity level for a first R2R alarm, when the first R2R alarm is created for the first wafer; establishing a first severity level for a first FDC alarm, when the first FDC alarm is created for the first wafer; establishing a total severity level using the first severity level for the first R2R alarm and the first severity level for the first FDC alarm;

declaring a fault condition when the total severity level is greater than or equal to a severity limit; and waiting for another alarm from another wafer when the total severity level is less than the severity limit.

26. The computer-implemented method as claimed in claim 25, further comprising:

sending an intervention message to the process module when a fault condition is declared;

pausing the process module when the intervention message is received and a fault level is less than a fault limit; and stopping the process module when the intervention message is received and the fault level is greater than or equal to the fault limit.

27. The computer-implemented method as claimed in claim 20, further comprising:

updating the R2R model when the actual trim amount for the first wafer is substantially less than the calculated trim amount for the first wafer; and updating the FDC model when the actual trim amount for the first wafer is substantially less than the predicted trim amount for the first wafer.

28. The computer-implemented method as claimed in claim 20, further comprising:

obtaining wafer state data, wherein the wafer state data includes measured critical dimension (CD) data for a plurality of test structures on the first wafer collected using an integrated metrology module (IMM) comprising an Optical Digital Profilometry (ODP) system;

obtaining reference data for the plurality of test structures on the first wafer, wherein the reference data is obtained using a CDSEM;

comparing the measured CD data to the reference data; and declaring an alarm when a difference between the reference data and the measured CD data is larger than a threshold value.

29. The computer-implemented method, as claimed in claim 28, wherein the measured CD data is obtained by measuring a plurality of grating patterns on the first wafer.

30. The computer-implemented method as claimed in claim 20, further comprising:

obtaining measurement data for a plurality of nested structures on the first wafer, wherein the measurement data is obtained using ODP;

obtaining reference data for the plurality of nested structures on the first wafer, wherein the measurement data is obtained using a CDSEM; and using a difference between the measurement data for the plurality of nested structures and the reference data for the plurality of nested structures to determine the calculated first trim amount.

31. The computer-implemented method, as claimed in claim 20, further comprising:

obtaining measurement data for a plurality of isolated structures on the first wafer, wherein the measurement data is obtained using ODP;

obtaining reference data for the plurality of isolated structures on the first wafer, wherein the measurement data is obtained using a CDSEM; and using a difference between the measurement data for the plurality of isolated structures and the reference data for the plurality of isolated structures to determine the calculated first trim amount.

32. The computer-implemented method, as claimed in claim 20, further comprising:

obtaining pre-process metrology data;

filtering the pre-process metrology data; and declaring an error when a number of data outliers exceeds a threshold value.

33. The computer-implemented method, as claimed in claim 20, further comprising:

obtaining post-process metrology data;

filtering the post-process metrology data; and declaring an error when a number of data outliers exceeds a threshold value.

34. A computer-directed system for implementing Fault Detection and Classification (FDC) in an. Advanced Process Control (APC) system including a run-to-run (R2R) controller comprising:

a processing tool configured to process a wafer; and a processor configured to, receive process data from a first executed process run, receive a process recipe comprising a set of recipe parameters from the R2R controller based on an R2R control model, the R2R control model distinct from an FDC model, receive chamber and wafer state data, receive the FDC model from memory, the FDC model based on normal tool level parameters, compute a vector of predicted dependent process parameters using the FDC model, the chamber and wafer state data, and the process recipe, execute the process recipe for only a first wafer of a plurality of wafers in a lot to produce a first vector of measured dependent process parameters, calculate a first difference for the first wafer using the vector of predicted dependent process parameters and the first vector of measured dependent process parameters for the first wafer, compare the first difference for the first wafer to a threshold value, declare an alarm condition when the first difference for the first wafer is greater than the threshold value, and display alarm condition information on a GUI screen.

35. The computer-directed system as claimed in claim 34, wherein the processor is further configured to:

create an R2R control model that relates process parameter inputs to a desired process result using an automated design of experiments (DOE) methodology; and create the FDC model that relates the predicted dependent process parameters to independent process parameters using an automated DOE methodology.

36. The computer-directed system as claimed in claim 34, wherein the processor is further configured to:
establish a severity level for the alarm condition;
declare a fault condition when the severity level for an alarm is greater than or equal to a severity limit, wherein a fault level is established for the fault condition; and
wait for another alarm when the severity level for the alarm is less than the severity limit.

37. The computer-directed system as claimed in claim 36, wherein the processor is further configured to:
send an intervention message to a process module when the fault condition is declared;
pause the process module when the intervention message is received and the fault level is less than a fault limit; and
stop the process module when the intervention message is received and the fault level is greater than or equal to the fault limit.

38. The computer-directed system as claimed in claim 36, wherein the processor is further configured to:
receive an additional alarm;
establish a severity level for the additional alarm;
establish a total severity level using the severity level for the alarm and the severity level for the additional alarm;
declare an additional fault condition when the total severity level is greater than or equal to the severity limit; and
wait for another alarm when the total severity level is less than the severity limit.

39. The computer-directed system as claimed in claim 38, wherein the processor is further configured to:
send an intervention message to a process module when the additional fault condition is declared;
pause the process module when the intervention message is received and the fault level is less than a fault limit; and
stop the process module when the intervention message is received and the fault level is greater than or equal to the fault limit.

40. The computer-directed system as claimed in claim 34, wherein the processor is further configured to:
determine if an alarm is in a feedforward element or a feedback element;
establish a first severity level when the alarm is in a feedforward element;
establish a second severity level when the alarm is in a feedback element;
declare a fault condition when the first severity level, or the second severity level, or the combination is greater than or equal to a severity limit, wherein a fault level is established for the fault condition; and
wait for another alarm when the first severity level, or the second severity level, or the combination is less than the severity limit.

41. The computer-directed system as claimed in claim 40, wherein the processor is further configured to:
send an intervention message to a process module when a fault condition is declared;
pause the process module when the intervention message is received and the fault level is less than a fault limit; and
stop the process module when the intervention message is received and the fault level is greater than or equal to the fault limit.

42. The computer-directed system as claimed in claim 40, wherein the processor is further configured to:
store data for the alarm condition.

43. A computer storage medium containing a software routine that, when executed, causes a general purpose computer to control an apparatus using a processing method, comprising:
receiving an FDC model from memory, the FDC model based on normal tool level parameters;
providing the FDC model to a process model calculation engine;
receiving a process recipe comprising a set of recipe parameters from the R2R controller based on an R2R control model, the R2R control model distinct from the FDC model;
receiving chamber and wafer state data;
computing a vector of predicted dependent process parameters using the process model calculation engine based on the provided FDC model the chamber state and wafer state data and the process recipe;
providing the process recipe to a process module;
executing the process recipe using only a first wafer of a plurality of wafers in a lot to produce a first vector of measured dependent process parameters;
calculating a first difference for the first wafer using the vector of predicted dependent process parameters and the first vector of measured dependent process parameters for the first wafer;
comparing the first difference for the first wafer to a threshold value;
declaring an alarm condition when the first difference for the first wafer is greater than the threshold value; and
displaying alarm condition information on a GUI screen.

44. The computer storage medium of claim 43, wherein said processing method further comprises:
creating an R2R control model that relates process parameter inputs to a desired process result using an automated design of experiments (DOE) methodology; and
creating the FDC model that relates the predicted dependent process parameters to independent process parameters using an automated DOE methodology.

45. The computer storage medium of claim 43, wherein said processing method further comprises:
establishing a severity level for an alarm;
declaring a fault condition when the severity level for the alarm is greater than or equal to a severity limit, wherein a fault level is established for the fault condition; and
waiting for another alarm when the severity level for the alarm is less than the severity limit.

46. The computer storage medium of claim 45, wherein said processing method further comprises:
sending an intervention message to the process module when the fault condition is declared;
pausing the process module when the intervention message is received and the fault level is less than a fault limit; and
stopping the process module when the intervention message is received and the fault level is greater than or equal to the fault limit.

47. The computer storage medium of claim 45, wherein said processing method further comprises:
receiving an additional alarm;
establishing a severity level for the additional alarm;
establishing a total severity level using the severity level for the alarm and the severity level for the additional alarm;
declaring an additional fault condition when the total severity level is greater than or equal to the severity limit; and
waiting for another alarm when the total severity level is less than the severity limit.

48. The computer storage medium of claim 47, further comprising:
- sending an intervention message to the process module when the additional fault condition is declared;
- pausing the process module when the intervention message is received and the fault level is less than a fault limit; and
- stopping the process module when the intervention message is received and the fault level is greater than or equal to the fault limit.

49. The computer storage medium of claim 43, wherein said processing method further comprises:
- determining if an alarm is in a feedforward element or a feedback element;
- establishing a first severity level when the alarm is in a feedforward element;
- establishing a second severity level when the alarm is in a feedback element;
- declaring a fault condition when the first severity level, or the second severity level, or the combination is greater than or equal to a severity limit, wherein a fault level is established for the fault condition; and
- waiting for another alarm when the first severity level, or the second severity level, or the combination is less than the severity limit.

50. The computer storage medium of claim 49, wherein said processing method further comprises:
- sending an intervention message to the process module when a fault condition is declared;
- pausing the process module when the intervention message is received and a fault level is less than a fault limit; and
- stopping the process module when the intervention message is received and the fault level is greater than or equal to the fault limit.

51. The computer storage medium of claim 49, wherein said processing method further comprises:
- storing data for the alarm condition.

* * * * *